(12) United States Patent
Shimizu et al.

(10) Patent No.: US 10,484,548 B2
(45) Date of Patent: Nov. 19, 2019

(54) OPERATION DISPLAY SYSTEM, OPERATION DISPLAY APPARATUS, AND OPERATION DISPLAY PROGRAM

(71) Applicant: KONICA MINOLTA, INC., Chiyoda-ku, Tokyo (JP)

(72) Inventors: Hideaki Shimizu, Hino (JP); Yasuaki Sugimoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 581 days.

(21) Appl. No.: 15/158,976

(22) Filed: May 19, 2016

(65) Prior Publication Data

US 2016/0349893 A1 Dec. 1, 2016

(30) Foreign Application Priority Data

May 28, 2015 (JP) ................... 2015-109135

(51) Int. Cl.
*G06F 3/041* (2006.01)
*H04N 1/00* (2006.01)
*G06F 3/01* (2006.01)
*G06F 3/0488* (2013.01)

(52) U.S. Cl.
CPC ......... *H04N 1/00307* (2013.01); *G06F 3/013* (2013.01); *G06F 3/0416* (2013.01); *G06F 3/04883* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2009/0219484 A1* | 9/2009 | Ebisawa | A61B 3/113 351/210 |
| 2013/0113715 A1* | 5/2013 | Grant | G06F 3/0488 345/173 |
| 2016/0034086 A1* | 2/2016 | Milam | G06F 3/0414 345/173 |

FOREIGN PATENT DOCUMENTS

JP 2011150737 A 8/2011

* cited by examiner

*Primary Examiner* — Carl Adams
(74) *Attorney, Agent, or Firm* — Holtz, Holtz & Volek PC

(57) ABSTRACT

An operation display system having a hardware processor is disclosed. The hardware processor acquires load references serving as a reference of pressing force by which a touch panel receives an operation. The hardware processor compares the acquired load references with each other. The hardware processor controls a degree of a change in pressing force for pressing a touch panel of a second operation display apparatus to be notified when there is a difference as a comparison result of load references of a first operation display apparatus operated by a user most recently and the second operation display apparatus to be subsequently operated among a plurality of operation display apparatuses.

27 Claims, 17 Drawing Sheets

Operation Display Unit of MFP
(Resistive-Film Type)

Operation Display Unit of Portable Terminal
(Capacitive Type)

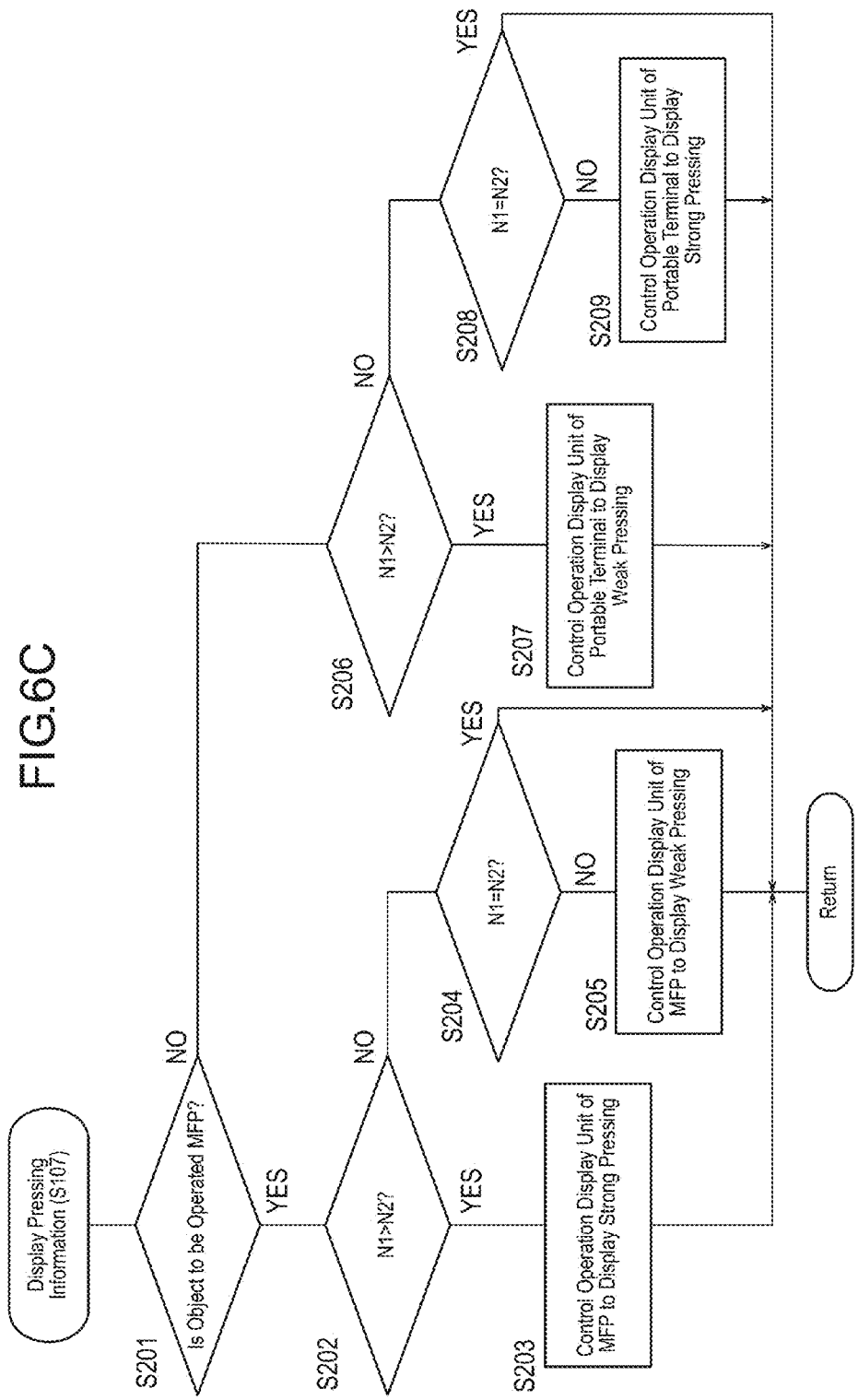

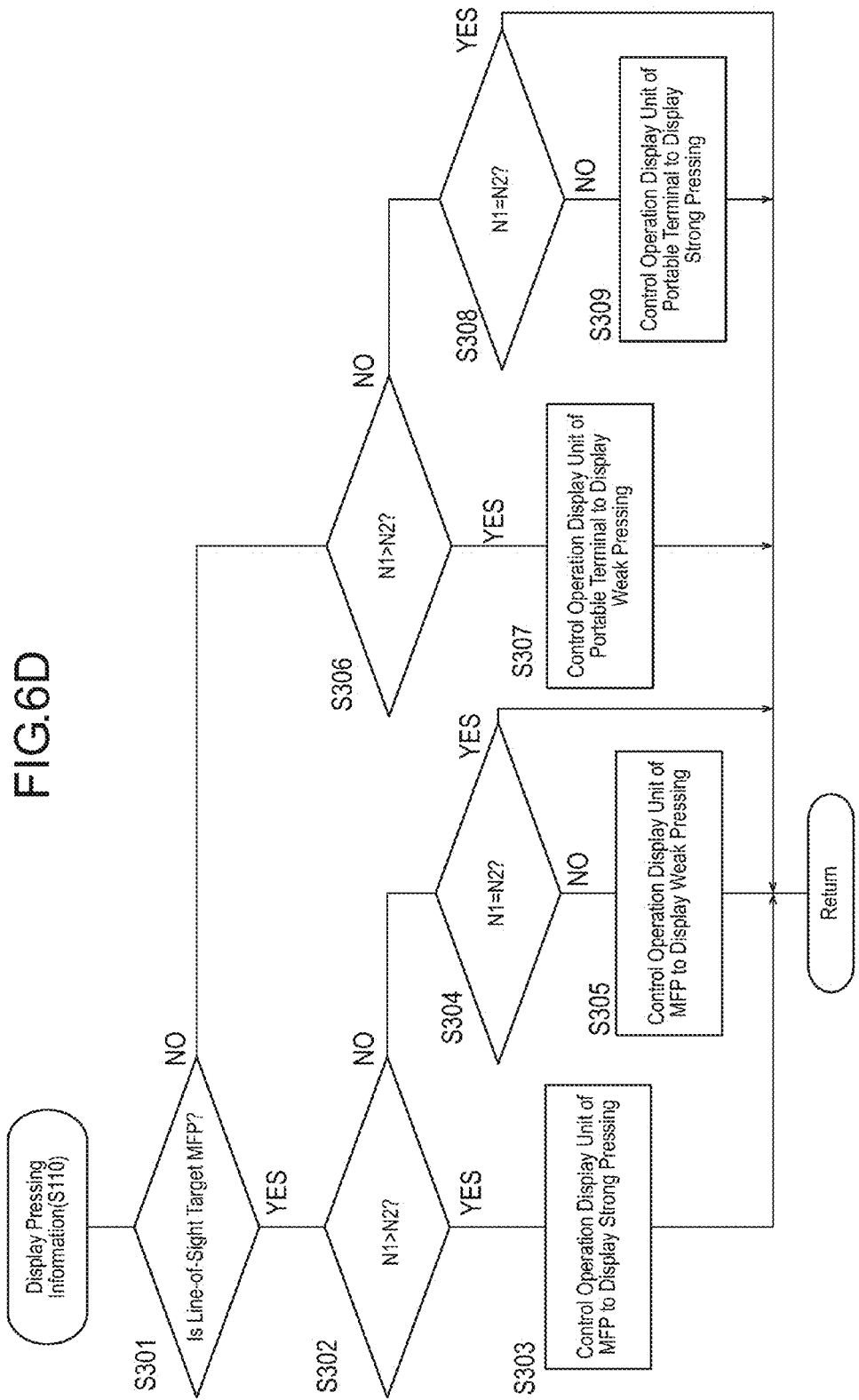

Operation Display Unit of MFP
(Load Reference : High)

Operation Display Unit of Portable Terminal
(Load Reference : Low)

Operation Display Unit of MFP
(Load Reference : High)

Operation Display Unit of Portable Terminal
(Load Reference : Low)

Hard Image

Soft Image

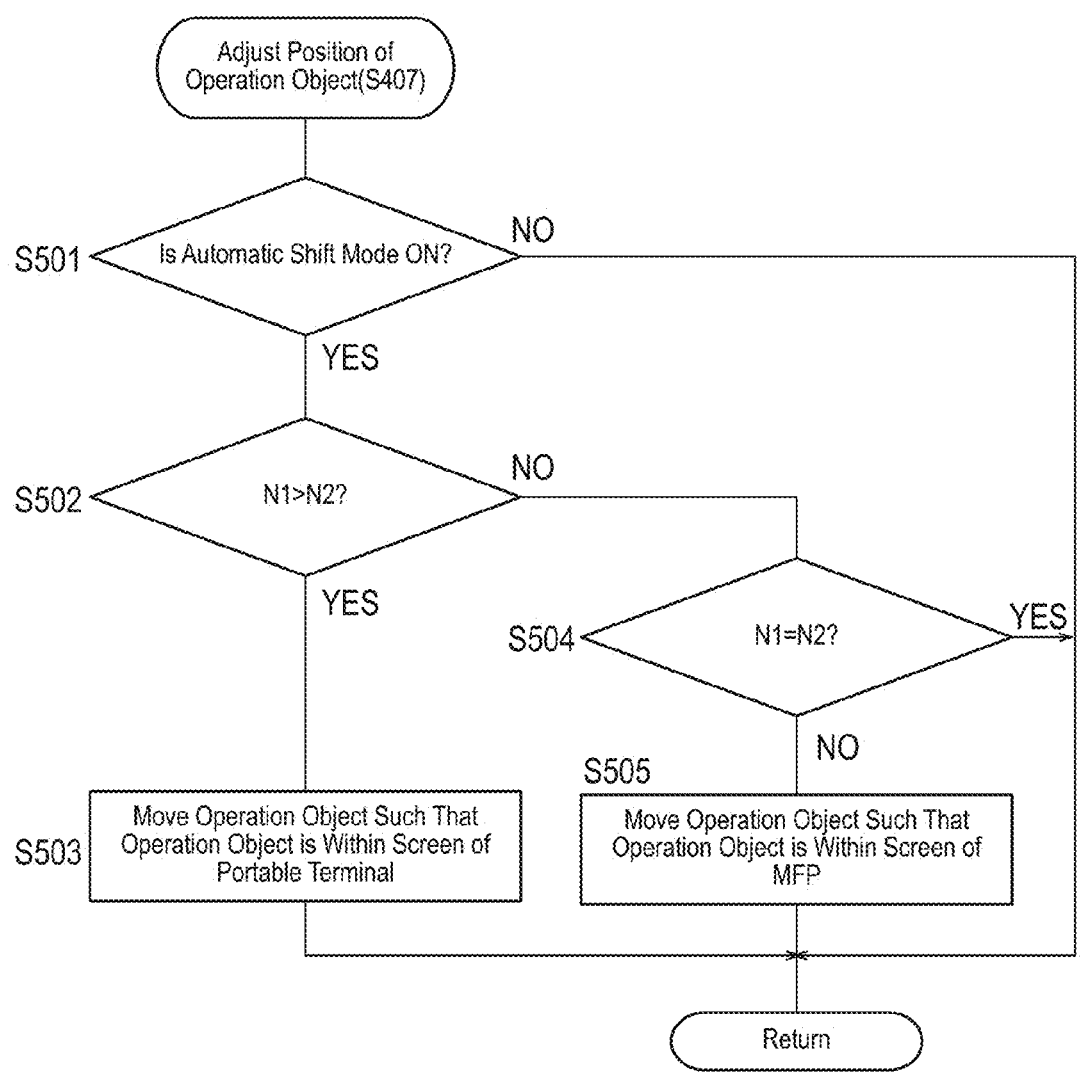

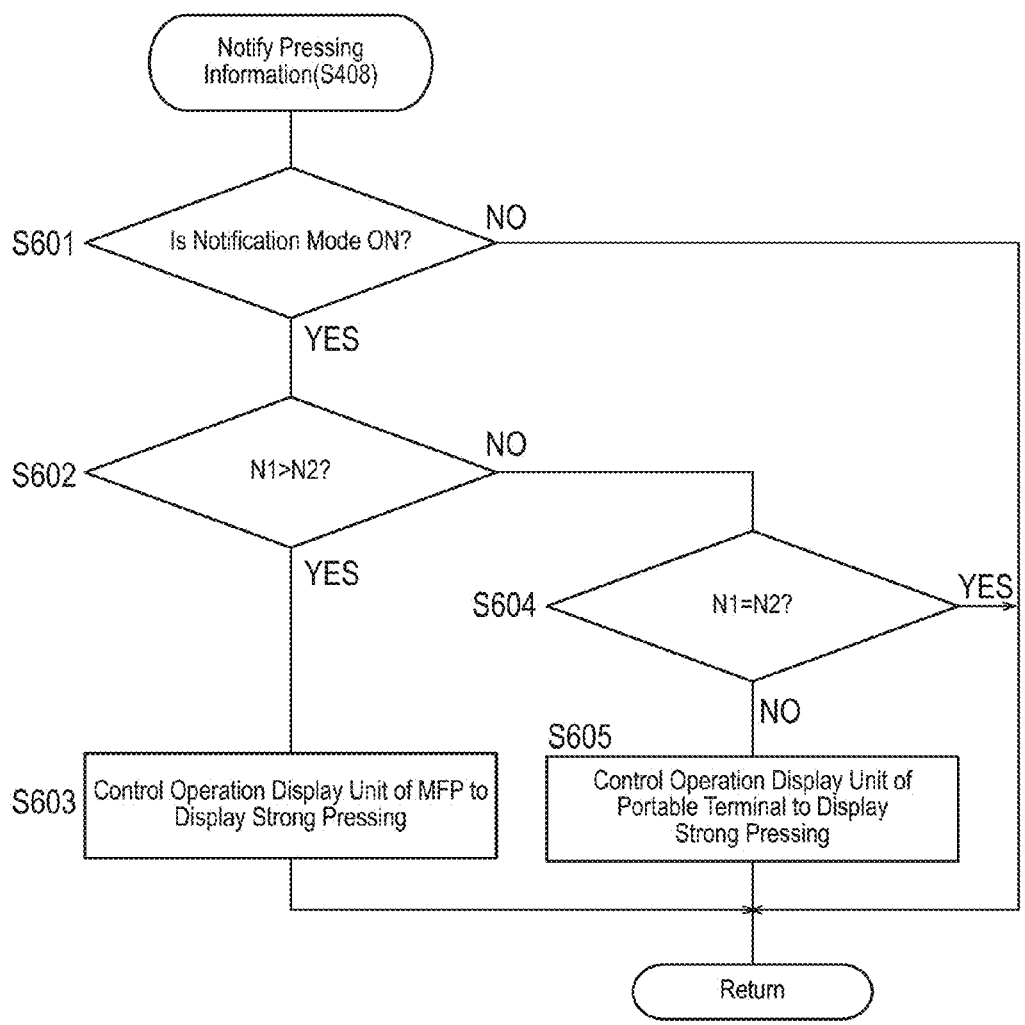

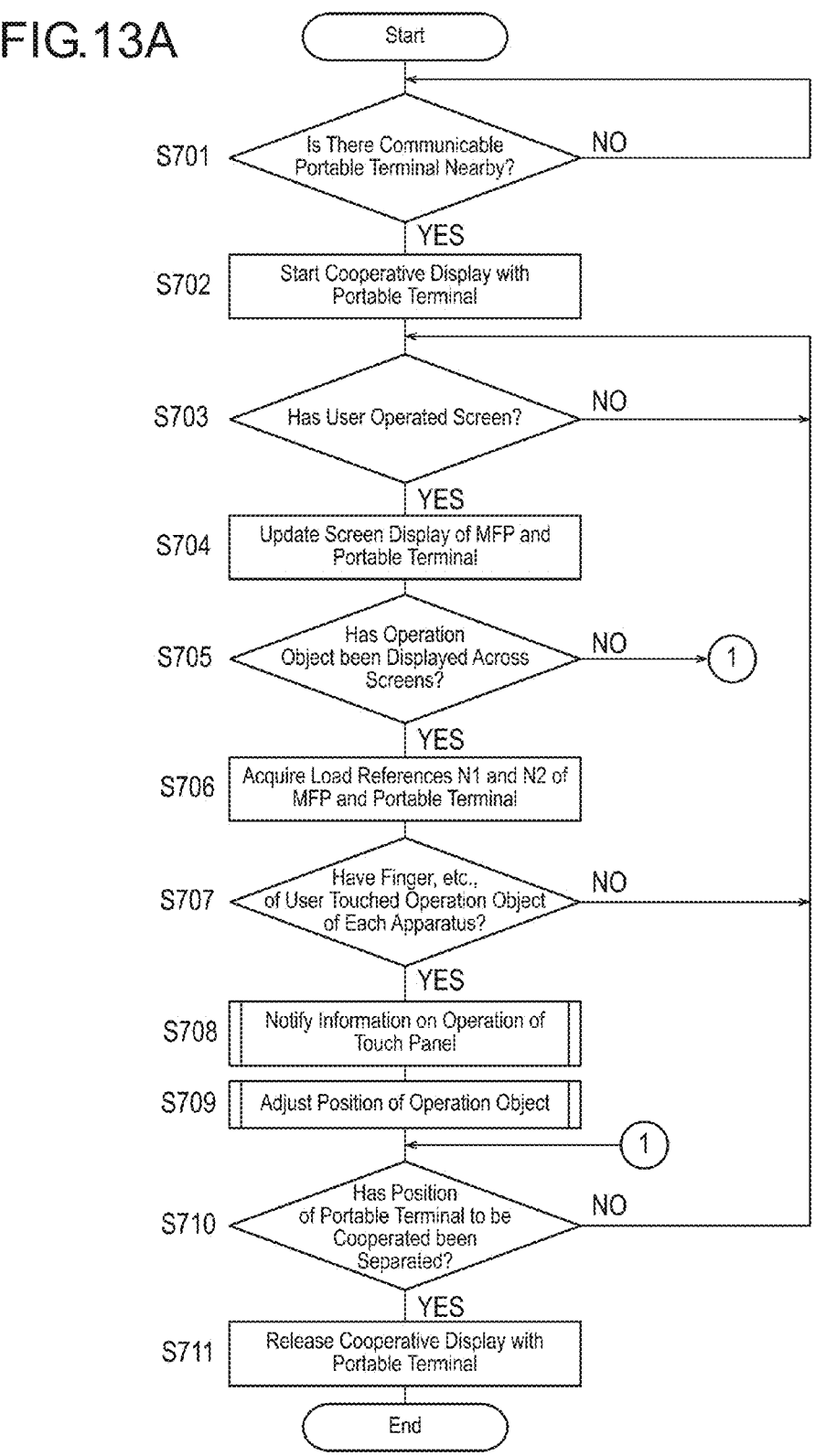

OPERATION DISPLAY SYSTEM, OPERATION DISPLAY APPARATUS, AND OPERATION DISPLAY PROGRAM

CROSS-REFERENCE TO RELATED APPLICATION

This application is based on Japanese Patent Application No. 2015-109135 filed on May 28, 2015, the contents of which are incorporated herein by reference.

BACKGROUND

1. Technical Field

The present invention relates to an operation display system, an operation display apparatus, and an operation display program.

2. Description of Related Arts

In recent years, electronic apparatuses including touch panels, for example, a cellular phone such as a smart phone and MFP (Multifunction Peripheral), have been generally spread. The touch panel is normally configured by integrally forming a display device such as a liquid crystal display with an input device such as a touch pad. For example, when a user inputs information to the touch panel, the user can contact image objects, such as icons and buttons displayed on a screen of the touch panel, by using a finger or a touch pen, thereby selecting the aforementioned icons, buttons etc., and inputting the information. Moreover, there has also been developed a touch panel capable of receiving various input operations through an action (flickering) of lightly flipping a screen in the state in which the screen has been contacted with a finger or an action (swiping) of slipping the screen in the state in which the screen has been contacted with a finger for example, as well as an action of simply contacting the screen with a finger.

On the other hand, with the high functionality of an electronic apparatus, since information displayed on a touch panel is increased and diversified, there may be a case in which the size of a screen is limited with only one touch panel and it is not possible to display all necessary information at a time. In such a case, by scrolling the screen in a vertical or horizontal direction, it is possible to see an unseen part. However, since the size of a screen visible at a time is limited, apart seen up to now becomes unseen, resulting in inconvenience.

In this regard, there has been known a technology (hereinafter, written as "cooperative display") of allowing a plurality of electronic apparatuses including touch panels to cooperate with one another, thereby configuring one large screen by a plurality of touch panels and displaying image objects associated with one another across the plurality of touch panels. When such a technology is used, image objects can be displayed on a larger screen by using the plurality of touch panels. Furthermore, in the plurality of touch panels subjected to the cooperative display, a user can perform operations among the plurality of touch panels (hereinafter, written as a "cooperative operation") similarly to the case of operating one touch panel.

However, in touch panels of electronic apparatuses currently on the market, several types exist depending on operational principles, and based on the types, a difference may exist in references of pressing force (hereinafter, written as "load references") by which the touch panels receive operations. For example, as a main type of a touch panel, there are a resistive-film type and a capacitive type. In a resistive-film type touch panel, a load reference is higher than that of a capacitive type touch panel, and input pressure needs to be stronger than that of a capacitive type touch panel. Consequently, for example, when a flick operation or a swipe operation is performed, a user may feel that a touch panel with a low load reference is easy to operate because it is possible to operate it at small pressure force, but may feel that a touch panel with a high load reference is difficult to operate.

In this regard, there has been known a technology for improving the operability of a touch panel, for example, a technology of Japanese Unexamined Publication No. 2011-150737. Japanese Unexamined Publication No. 2011-150737 discloses a technology aiming at suppressing an abnormal operation of the touch panel by allowing load references to differ in adjacent image objects. When such a technology is used, it is possible to expect the improvement of the operability of individual touch panels.

However, although the operability of individual touch panels has been improved using the technology as disclosed in Japanese Unexamined Publication No. 2011-150737, when a plurality of electronic apparatuses are allowed to cooperate with one another, if there is a difference in the operability of the respective touch panels, it is difficult to be operated by a user. For example, when a plurality of electronic apparatuses including touch panels having different load references are allowed to cooperate with one another, there is a difference between the operability of an electronic apparatus including a touch panel having a high load reference and the operability of an electronic apparatus including a touch panel having a low load reference. As a consequence, since the touch panels do not operate as the intention of a user, the user may feel a burden.

For example, in two operation display apparatuses having different load references, when a flick operation is performed on a touch panel having a low load reference and then is performed on a touch panel having a high load reference, a user may feel that the operability of the touch panels has been suddenly reduced.

Furthermore, when a user performs a multi-touch operation with respect to an operable object displayed across two operation display apparatuses having different load references by using his/her thumb, forefinger, etc., since it is necessary to apply different pressure force to respective fingers, a user may feel a burden.

SUMMARY

The present invention is intended to solve the aforementioned problems in the prior art, and one of the objects of the present invention is to provide an operation display system, an operation display apparatus, and operation display program, by which it is possible to reduce a burden of a user due to a difference in operability caused by a difference in load references between operation display apparatuses.

In order to achieve at least one of the aforementioned objects, an operation display system having a plurality of operation display apparatuses including a touch panel, reflecting one aspect of the present invention, comprises a hardware processor configured to: acquire load references serving as a reference of pressing force by which the touch panel receives an operation, compare the acquired load references with each other. The hardware processor controls a degree of a change in pressing force for pressing a touch panel of a second operation display apparatus to be notified when there is a difference as a comparison result of load references of a first operation display apparatus operated by a user most recently and the second operation display apparatus to be subsequently operated among the plurality of operation display apparatuses.

Preferably, the hardware processor controls the degree of the change in the pressing force to be displayed on a screen of any one of the plurality of operation display apparatuses.

Preferably, the hardware processor controls the degree of the change in the pressing force to be displayed on a screen of the second operation display apparatus.

Preferably, the operation display system further has a line-of-sight detector for detecting a line-of-sight of a user, and on a basis of a detection result of the line-of-sight detector, the hardware processor displays the degree of the change in the pressing force on a screen of an operation display apparatus currently viewed by a user among the plurality of operation display apparatuses.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6C is a sub-routine flowchart for explaining a process (step S107) of displaying pressing information of FIG. 6A.

FIG. 6D is a sub-routine flowchart for explaining a process (step S110) of displaying pressing information of FIG. 6B.

FIG. 10B is a sub-routine flowchart for explaining a process (step S407) of adjusting a position of an operation object of FIG. 10A.

FIG. 10C is a sub-routine flowchart for explaining a process (step S408) of notifying pressing information of FIG. 10A.

FIG. 13A is a flowchart for explaining one example of a processing procedure of an operation display method in a third embodiment of the present invention.

DETAILED DESCRIPTION

Figure 1:
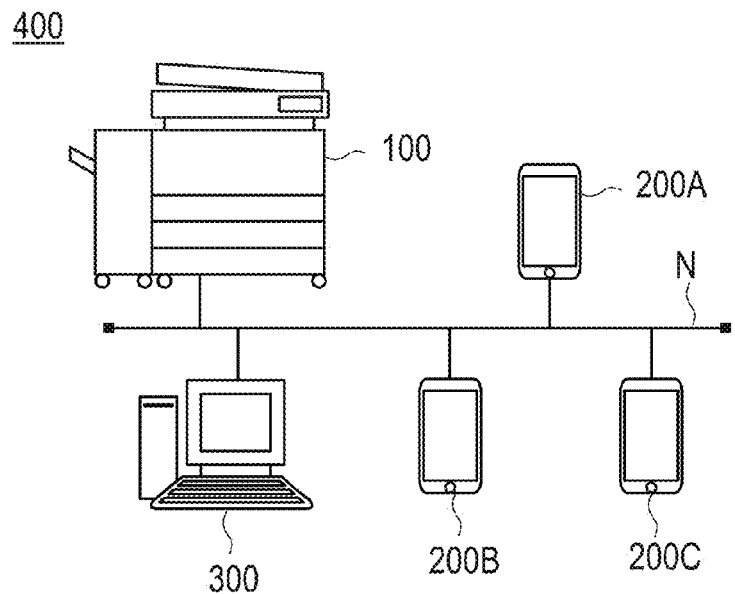
FIG. 1 is a schematic diagram for explaining a configuration of an operation display system of a first embodiment of the present invention.

The embodiments of an operation display system, an operation display apparatus, and an operation display program of this invention will be described below with reference to the accompanying drawings. In addition, in a description of the drawings, the same reference numerals are used to designate the same elements.

First Embodiment

<Configuration of Operation Display System>

Figure 2:
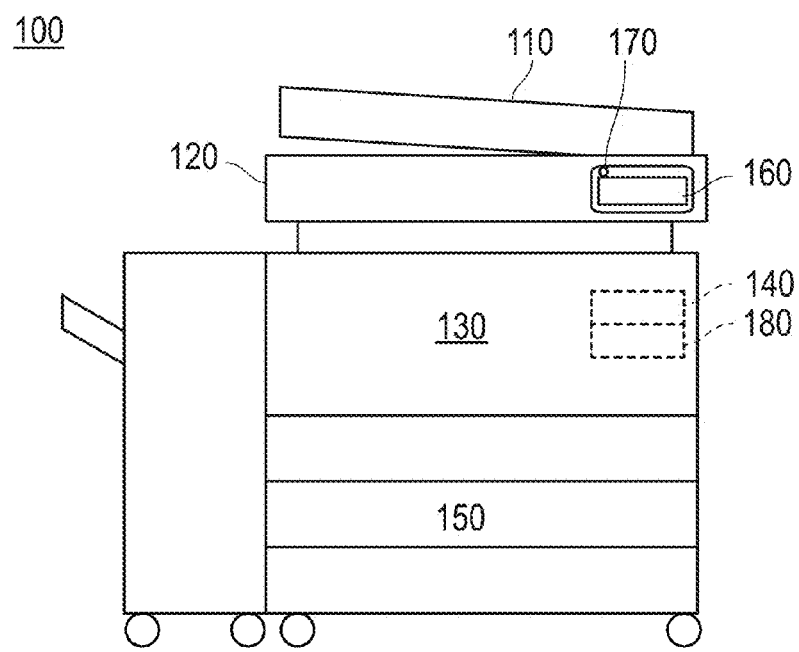
FIG. 2 is a side view for explaining a schematic configuration of an image forming apparatus illustrated in FIG. 1.
Figure 3:
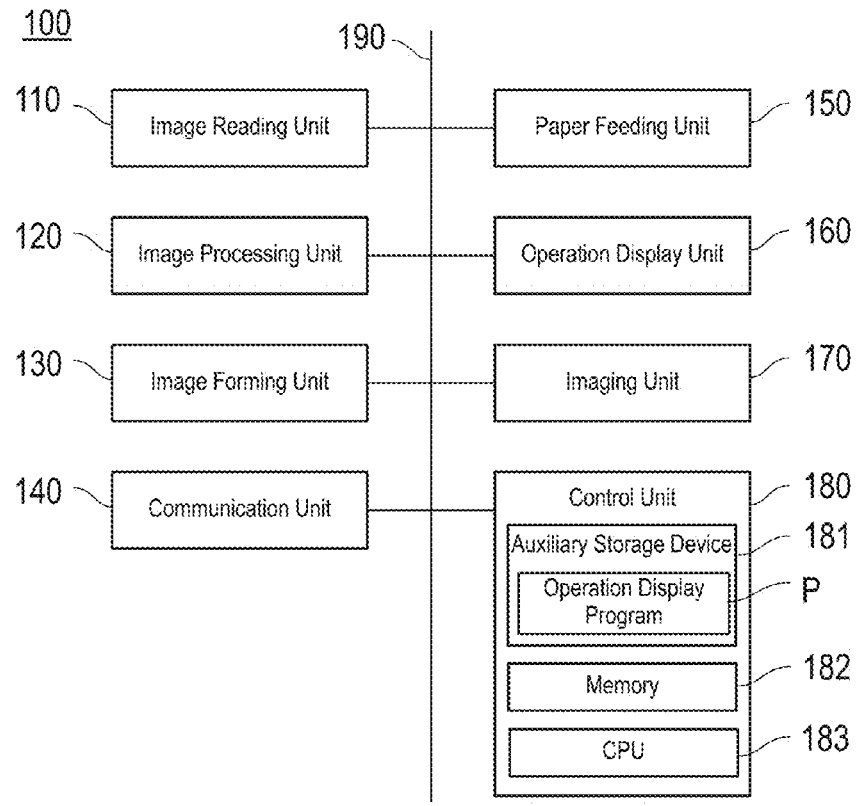
FIG. 3 is a block diagram for explaining a schematic configuration of an image forming apparatus illustrated in FIG. 1.

FIG. 1 is a schematic diagram for explaining a configuration of an operation display system of a first embodiment of the present invention. Furthermore, FIG. 2 and FIG. 3 are a side view and a block diagram for explaining a schematic configuration of an image forming apparatus illustrated in FIG. 1, respectively.

As illustrated in FIG. 1, an operation display system 400 has an image forming apparatus 100, portable terminal apparatuses 200A, 200B, and 200C, and a server 300. These elements are connected to an access point and are configured to be able to communicate with one another via a network N. In addition, the aforementioned elements may also be directly connected to one another without using the access point and the network. Furthermore, the aforementioned elements may also be connected to one another in a wireless manner, or in a wired manner.

The image forming apparatus 100 of the present embodiment, for example, may be an MFP, a printer, a facsimile, etc. Hereinafter, the case in which the image forming apparatus 100 is the MFP will be described as an example. Furthermore, the portable terminal apparatuses 200A, 200B, and 200C, for example, may be a cellular phone such as a smart phone, or portable information terminals such as PDA (personal Digital Assistants). Hereinafter, in the present specification, for the purpose of convenience, the portable terminal apparatuses are written as "portable terminals".

In addition, FIG. 1 illustrates the case in which one MFP, three portable terminals, and one server are connected to the network N; however, the number of MFPs, the number of portable terminals, and the number of servers are not limited to this case. Furthermore, any one of the aforementioned elements may also be omitted or other elements may also be added.

Furthermore, the network N includes various networks such as LAN (Local Area Network) that connects computers or network devices to one another by a standard like Ethernet (registered trademark), Token Ring, FDDI (Fiber-Distributed Data Interface), etc., WAN (Wide Area Network) that connects LANs to one another by dedicated lines, the Internet, and a combination thereof. A network protocol, for example, is TCP/IP (Transmission Control Protocol/Internet Protocol).

<Configuration of MFP>

As illustrated in FIG. 2 and FIG. 3, the MFP 100 has an image reading unit 110, an image processing unit 120, an image forming unit 130, a communication unit 140, a paper feeding unit 150, an operation display unit 160, an imaging unit 170, and a control unit 180. These elements are connected to one another by an internal connection line 190. In the present embodiment, the MFP 100 serves as an operation display apparatus.

The image reading unit 110 optically reads a document and generates an image data signal. The image reading unit 110 has a light source, an optical system, an image sensor, and an analog-to-digital conversion circuit. In the image reading unit 110, the light source sequentially irradiates light of each color (R, G, and B) to the document. The optical system has a plurality of mirrors and an image forming lens, and an image of reflected light from the document is formed on the image sensor through the mirrors and the image forming lens of the optical system. The image sensor reads reflected light corresponding to each color (R, G, and B) in each line, and generates an electrical signal in response to the intensity of the reflected light from the document. The generated electrical signal is converted from an analog signal to a digital signal in the analog-to-digital conversion circuit, and is transmitted to the image processing unit 120 as an image data signal.

The image processing unit 120 performs various image processes on the aforementioned image data signal, thereby generating print image data. The image processes, for example, include shading correction, gamma correction, inter-line correction, color shift correction, an enlargement reduction process, a color conversion process, etc.

The image forming unit 130 forms an image by an electrophotographic process on the basis of the print image data, and fixes the formed image to a paper as a recording medium. In more detail, the image forming unit 130 allows a photoreceptor to be charged by a charging device, and applies light to the aforementioned photoreceptor by using a light emitting element such as laser and LED (Light Emitting Diode) on the basis of the print image data, thereby forming an electrostatic latent image. The print image data is generated in the image processing unit 120 or is generated by rasterizing a print job received in the communication unit 140. Then, the image forming unit 130 attaches toner to the electrostatic latent image on the aforementioned photoreceptor and then transfers the toner to a paper. The paper is fed by the paper feeding unit 150 and is conveyed to the image forming unit 130 by a paper conveying unit. The paper subjected to the transfer is conveyed to a fixing device through a conveying belt, and the fixing device heats and presses the toner transferred to the paper, thereby adhering the toner. The paper with an image formed through the adhesion of the toner is discharged to an exterior from a paper discharge tray.

The communication unit 140 is an interface for communicating with other apparatuses such as the portable terminals 200A, 200B, and 200C and the server 300 via a network. For the communication, standards, such as LTE (Long Term Evolution), W-CDMA (Wideband Code Division Multiple Access), Ethernet (registered trademark), Wi-Fi, FDDI, and token ring, are used. Furthermore, the communication unit 140, for example, has a near field communication function by Bluetooth (registered trademark), and can transmit/receive image data, etc., to/from the portable terminals 200A, 200B, and 200C. The communication unit 140 serves as a part of a hardware processor together with the control unit 180.

The paper feeding unit 150 includes at least one paper feeding tray and supplies papers to the image forming unit 130 one by one.

The operation display unit 160 receives various types of input from a user and displays information such as various types of setting, processing results, alerts, and messages. The operation display unit 160 includes a touch panel having a touch pad and a display device, and has a structure capable of processing the reception of input in parallel with the display of information. The touch panel can employ any one of a resistive-film type, a capacitive type, a surface acoustic wave type, an infrared type, an electromagnetic induction type, and a load detection type. Hereinafter, the case in which the operation display unit 160 includes a resistive-film type touch panel will be described as an example. Furthermore, the display device is arranged on a back surface of the touch pad and may include a liquid crystal display, an organic light emitting display, etc.

In the case of inputting information to the operation display unit 160, a user can contact with an object, which has been displayed on a screen of the operation display unit 160, by using a finger or a touch pen, thereby selecting the aforementioned object and inputting information. In addition, in the present specification, contacting with a touch panel by a user at pressing force received by the touch panel as input is called "touching". Furthermore, an object, for example, may include an icon, a button, and a background image drawn on the background of the icon or the button. Furthermore, in the present specification, an object capable of receiving an input operation is written as an "operation object".

Furthermore, a user can input information to the operation display unit 160 by using various operations (gestures) of fingers, such as moving a finger on a screen in the state of touching the screen with the finger, as well as an operation for simply touching the screen with a finger and inputting information. The operation display unit 160 of the present embodiment, for example, can receive tap, double tap, triple tap, long tap, drag, flick, swipe, pinch-in, pinch-out, etc., as input operations without particularly limiting thereto. Hereinafter, in the present specification, for the purpose of convenience, operations other than the tap, the double tap, the triple tap, and the long tap among the aforementioned input operations, for example, the drag, the flick, the swipe, the pinch-in, the pinch-out, etc., are written as "touch operations". Particularly, an operation for simultaneously touching a plurality of places of the touch panel, such as the pinch-in and the pinch-out, is written as a "multi-touch operation". In general, the touch operation and the multi-touch operation are input operations requiring more complicated operations of fingers as compared with the tap, the double tap, the triple tap, and the long tap.

The imaging unit 170 captures an object on the touch panel of the operation display unit 160. In the present embodiment, the imaging unit 170 includes a camera and serves as a line-of-sight detection unit. In the present embodiment, the imaging unit 170 captures eyes of a user in order to detect a line-of-sight direction of the user. Data captured by the imaging unit 170 is transmitted to the control unit 180.

The control unit 180 controls the image reading unit 110, the image processing unit 120, the image forming unit 130, the communication unit 140, the paper feeding unit 150, the operation display unit 160, and the imaging unit 170.

As illustrated in FIG. 3, the control unit 180 has an auxiliary storage device 181, a memory 182, and a CPU 183.

The auxiliary storage device 181, for example, is a large capacity storage device such as a hard disk drive and a solid state drive. The auxiliary storage device 181 stores various software programs such as an operating system and an operation display program P. The operation display program P is a software program for performing an operation display method of the present embodiment as will be described later. The operation display program P may also be installed in the auxiliary storage device 181 in advance, or may also be downloaded from the server 300 according to necessity.

The memory 182 includes a memory device such as RAM (Random Access Memory) and flash ROM (Read Only Memory). The aforementioned various software programs are temporarily stored in the aforementioned RAM when they are executed by the CPU 183. Furthermore, the aforementioned RAM stores a determination result and an arithmetic calculation result by the CPU 183. Furthermore, the aforementioned flash ROM stores various types of setting such as a load reference of the touch panel of the operation display unit 160, an operation type of an object, an operation object display mode, a line-of-sight mode, a notification mode, and an automatic shift mode.

The load reference is a reference of pressing force for deciding whether the touch panel receives an operation, and when the touch panel has been pressed at pressing force equal to or more than the reference, input is received. However, when the touch panel has been pressed at pressing force smaller than the reference, no input is received. In the present embodiment, preferably, the load reference has been normalized so as to be comparable among different types of touch panels in the same conditions.

The operation type of the object is a type regarding an operation of the touch panel with respect to each object displayed on the operation display unit 160. The operation type of the object, for example, includes a tap operation, a flick operation, etc. When the flick operation is included in the operation type of the object, it indicates that a corresponding object can be subjected to the flick operation.

The operation object display mode, the line-of-sight mode, the notification mode, and the automatic shift mode may be set through a manager menu. Details of these modes will be described later.

In the present embodiment, the control unit 180 acquires the load references of touch panels with respect to the MFP 100 and a portable terminal performing cooperative display with the MFP 100, and compares the load references with each other. In response to the determination result of the load references, the control unit 180 controls the display of the degree (for example, "strong" or "weak") of a change from pressing force for a first operation display apparatus operated by a user most recently to pressing force for a second operation display apparatus to be subsequently operated.

<Configuration of Portable Terminal>

Figure 4:
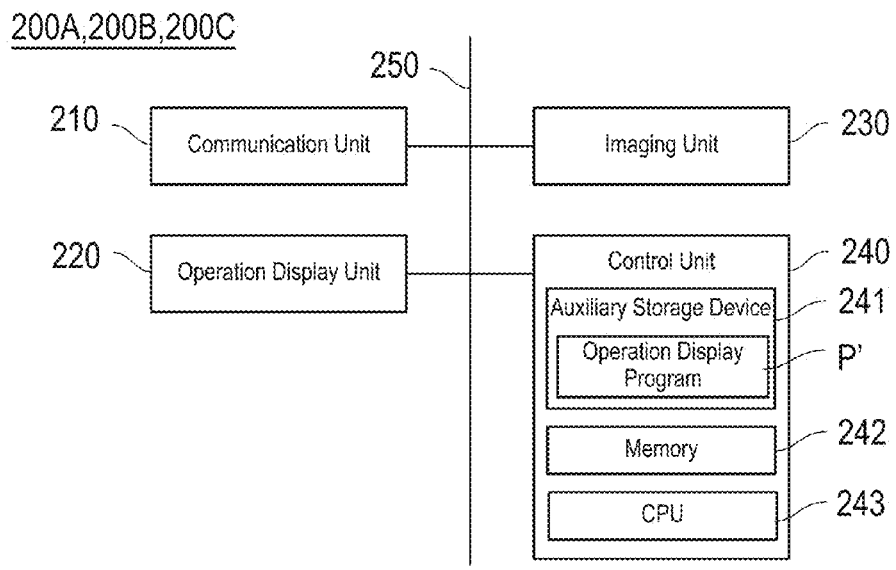
FIG. 4 is a block diagram for explaining a schematic configuration of a portable terminal illustrated in FIG. 1.

Next, with reference to FIG. 4, the outline of the configuration of each of the portable terminals 200A, 200B, and 200C will be described. FIG. 4 is a block diagram for explaining a schematic configuration of the portable terminal illustrated in FIG. 1. In addition, since the configurations of the portable terminals 200A, 200B, and 200C are equal to one another, the configuration of the portable terminal 200A will be described below and a description of the configurations of the portable terminals 200B and 200C will be omitted in order to avoid the redundancy of a description.

The portable terminal 200A has a communication unit 210, an operation display unit 220, an imaging unit 230, and a control unit 240. In the present embodiment, the portable terminal 200A serves as an operation display apparatus.

The communication unit 210 is an interface for communicating with other apparatuses such as the MFP 100 and the server 300 via the network N. For the communication, standards, such as LTE, W-CDMA, Ethernet (registered trademark), Wi-Fi, FDDI, and token ring, are used. Furthermore, the communication unit 210, for example, has a near field communication function by Bluetooth (registered trademark), and can transmit/receive image data, etc., to/from the MFP 100.

The communication unit 210 serves as a part of a hardware processor together with the control unit 240.

The operation display unit 220 receives various types of input from a user and displays information such as various types of setting, processing results, alerts, and messages. The operation display unit 220 includes a touch panel having a touch pad and a display device, and has a structure capable of processing the reception of input in parallel with the display of information. The touch panel can employ any one of a resistive-film type, a capacitive type, a surface acoustic wave type, an infrared type, an electromagnetic induction type, and a load detection type. Hereinafter, the case in which the portable terminal 200A includes a capacitive type touch panel will be described as an example. Furthermore, the display device is arranged on a back surface of the touch pad and may include a liquid crystal display, an organic light emitting display, etc.

The imaging unit 230 takes an image of an object on the touch panel of the operation display unit 220. In the present embodiment, the imaging unit 230 includes a camera and serves as a line-of-sight detection unit. In the present embodiment, the imaging unit 230 takes an image of eyes of a user in order to detect a line-of-sight direction of the user. Data captured by the imaging unit 230 is transmitted to the control unit 240.

The control unit 240 controls the communication unit 210, the operation display unit 220, and the imaging unit 230. As illustrated in FIG. 4, the control unit 240 has an auxiliary storage device 241, a memory 242, and a CPU 243.

The auxiliary storage device 241 stores various software programs such as an operating system and an operation display program P'. The operation display program P' is a software program for performing an operation display method of the present embodiment as will be described later. The operation display program P' may also be installed in the auxiliary storage device 241 in advance, or may also be downloaded from the server 300 according to necessity.

Since the memory 242 has a configuration similar to that of the memory 182 of the MFP 100, a detailed description will be omitted in order to avoid the redundancy.

<Cooperation of Operation Display Apparatus>

Figure 5:
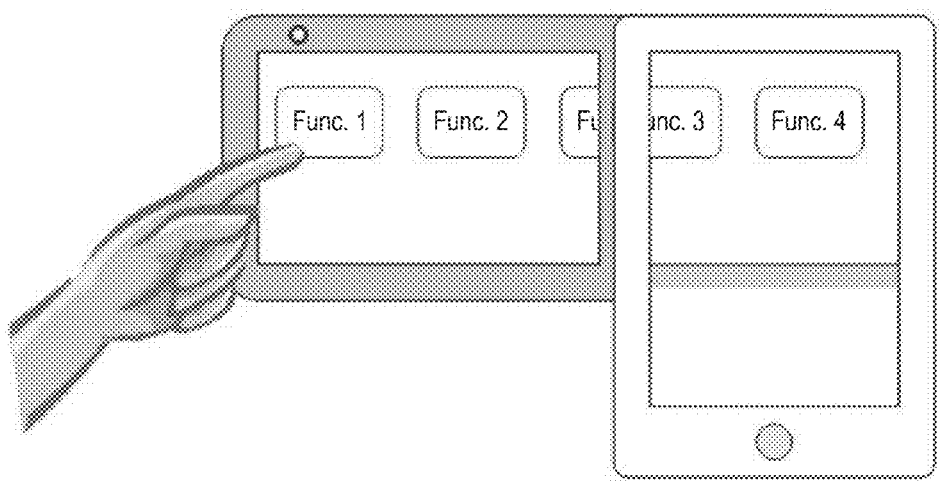
FIG. 5 is a schematic diagram for explaining cooperation of an operation display apparatus in an operation display system of a first embodiment of the present invention.

Next, with reference to FIG. 5, the cooperation of the operation display apparatus of the present embodiment will be described. FIG. 5 is a schematic diagram for explaining the cooperation of the operation display apparatus in the operation display system of the first embodiment.

In the present embodiment, when a distance between the MFP 100 and the portable terminal 200A is within a predetermined distance, the MFP 100 and the portable terminal 200A start to cooperate with each other.

When the cooperation is started, the control unit 180 and the control unit 240 cooperate with each other, so that display data and a control signal are exchanged via the communication unit 140 and the communication unit 210. For example, when the portable terminal 200A is placed at the right of the MFP 100, the control unit 180 and the control unit 240 control objects associated with each other to be continuously displayed over the operation display unit 220 from the operation display unit 160. In the example illustrated in FIG. 5, the operation display unit 160 and the operation display unit 220 configure one large screen and display operation objects (buttons) of a "func. 1" (function 1) to a "func. 4" (function 4) which are a part of a menu screen.

When a user operates the aforementioned menu screen by touching it, the operation display unit 160 and the operation display unit 220 process a screen operation of the user in cooperation with each other. Consequently, the user can operate the operation display unit 160 and the operation display unit 220 as one operation display unit. For example, when the user scrolls the display content of the operation display unit 160 in the right direction by a swipe operation, etc., the display content of the operation display unit 220 is also scrolled in the right direction according to the scrolling. As described above, the operation display unit 160 and the operation display unit 220 integrally display an object such that the display content of the operation display unit 160 and the display content of the operation display unit 220 are operated in response to a screen operation.

In addition, when an operation object (the button of the "function 3" in FIG. 5) displayed across the two touch panels of the operation display unit 160 and the operation display unit 220 is an object which can be subjected to a multi-operation, a user can also perform the multi-operation with respect to the object.

Furthermore, in FIG. 5, the case in which two operation display apparatuses of the MFP 100 and the portable terminal 200A cooperate with each other is illustrated as an example; however, the number of cooperable operation display apparatuses in the present embodiment is not limited to two.

Furthermore, the aforementioned distance is not particularly limited; however, preferably, it is set to about several cm. However, in consideration of the convenience of a user, the aforementioned distance can also be set to several meters to several tens of meters.

Moreover, in FIG. 5, the case in which two operation display apparatuses of the MFP 100 and the portable terminal 200A cooperate with each other in the horizontal direction of the paper surface is illustrated as an example; however, they can also cooperate with each other in the vertical direction.

As described above, with only one touch panel, since the size of a screen is limited, when there is an object not displayable at a time, a plurality of operation display apparatuses are allowed to cooperate with one another, so that it is possible to display many more objects at a time and operate them.

A detailed example in which a processing procedure of the operation display method of the present embodiment is performed using the MFP 100 and the portable terminal 200A having the above configurations will be described with reference to FIG. 6A to FIG. 6D, FIG. 7, and FIG. 8. The operation display method of the present embodiment is performed when the aforementioned operation display programs P and P' are respectively executed by the CPUs 183 and 243. The operation display programs P and P' are configured such that the MFP 100 and the portable terminal 200A perform the operation display method of the present embodiment in cooperation with each other. Furthermore, in the operation display programs P and P', the operation display program P may also play a leading role or the operation display program P' may also play a leading role in a relation between these two programs. The following description will be provided for the case in which the operation display program P plays a leading role.

<Outline of Operation Display Method>

Figure 6A:
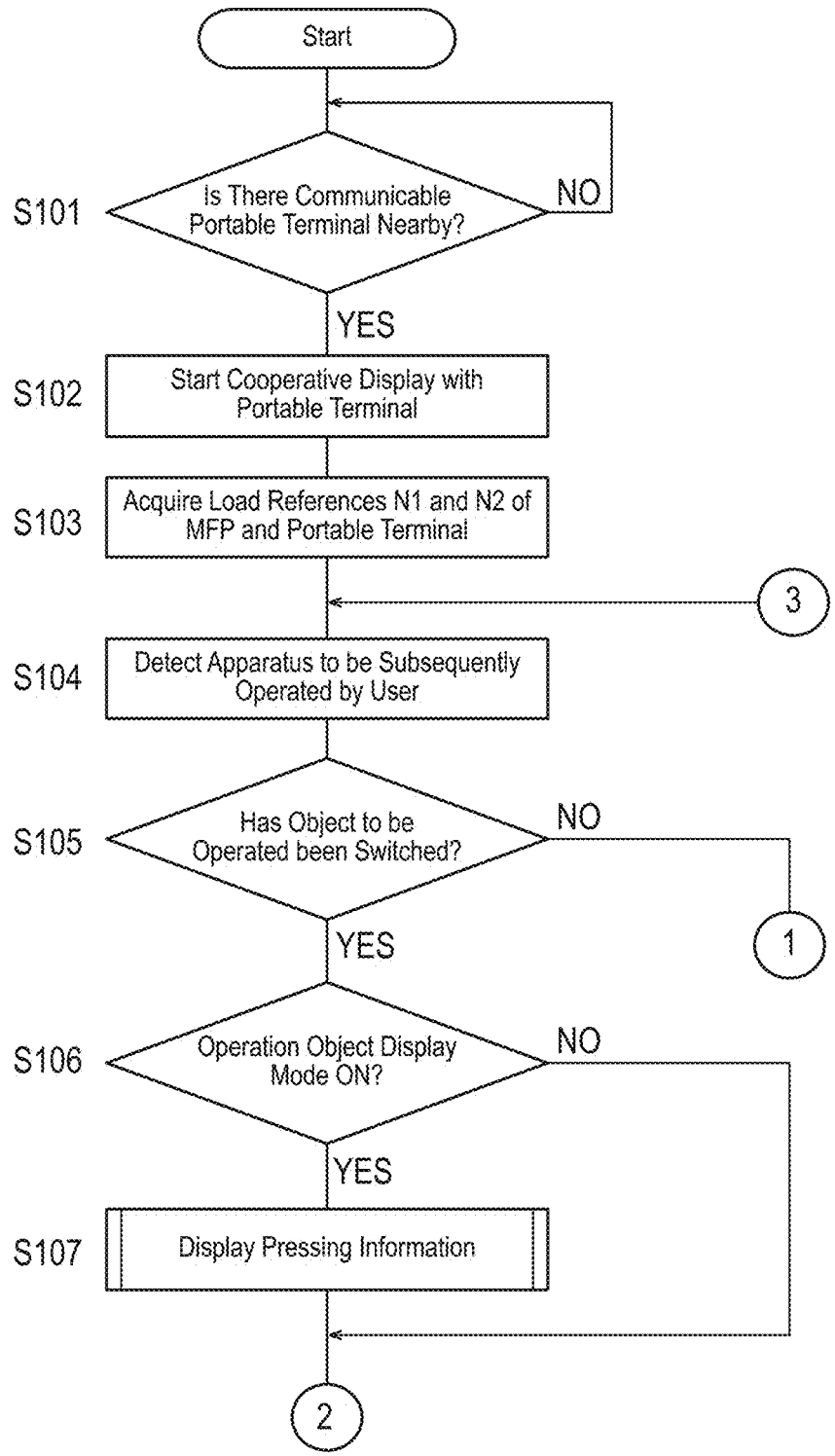
FIG. 6A is a flowchart for explaining one example of a processing procedure of an operation display method of a first embodiment of the present invention.
Figure 6B:
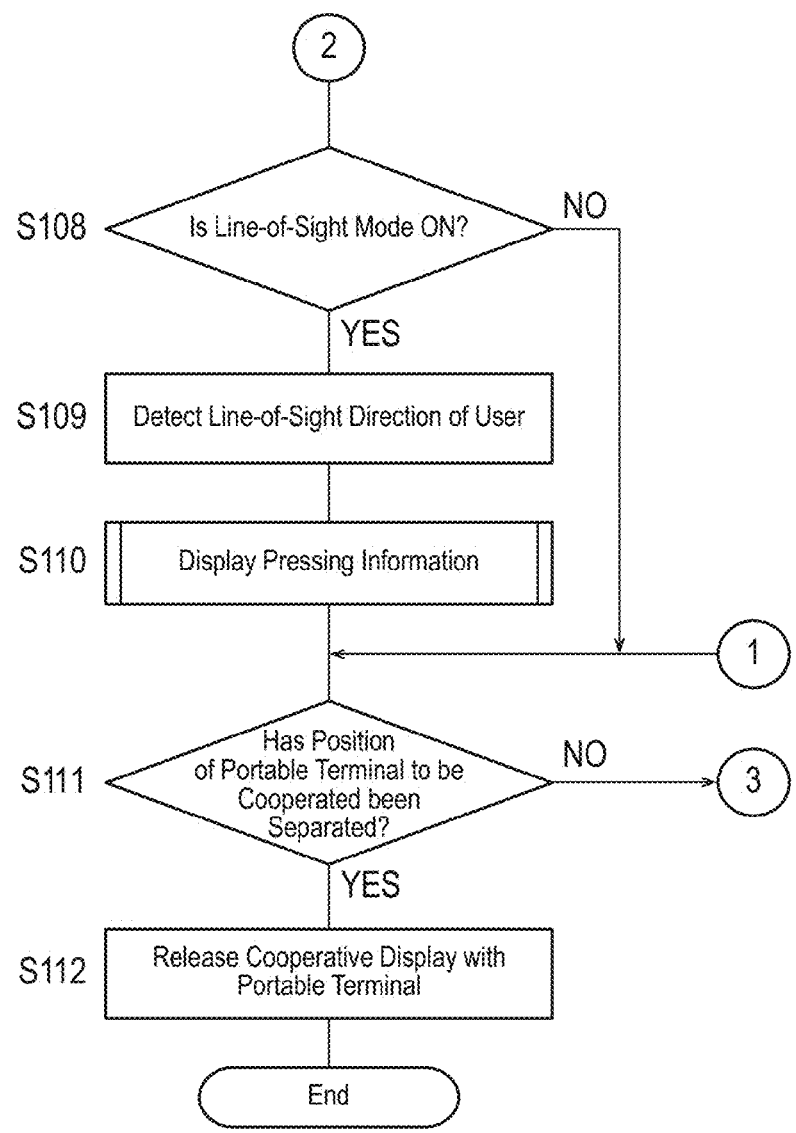
FIG. 6B is a flowchart subsequent to FIG. 6A.
Figure 7:
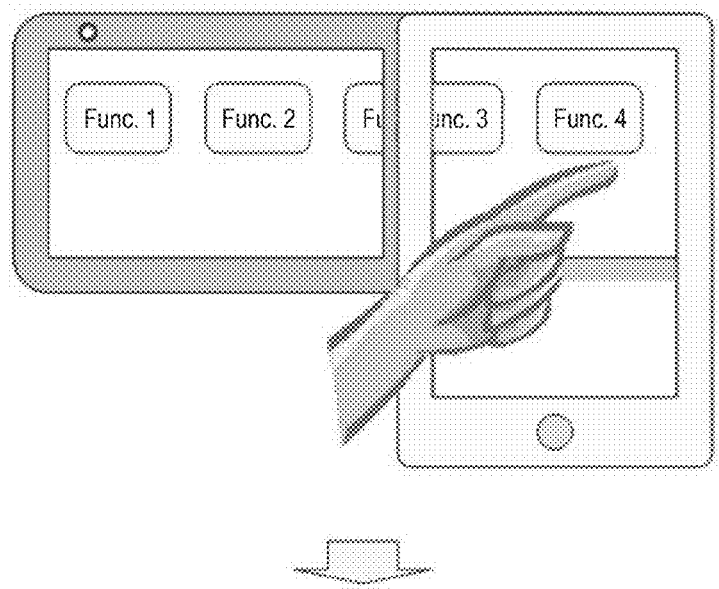
FIG. 7 is a schematic diagram illustrating switching of an object to be operated from an apparatus having a low load reference to an apparatus having a high load reference in a first embodiment of the present invention.
Figure 7:
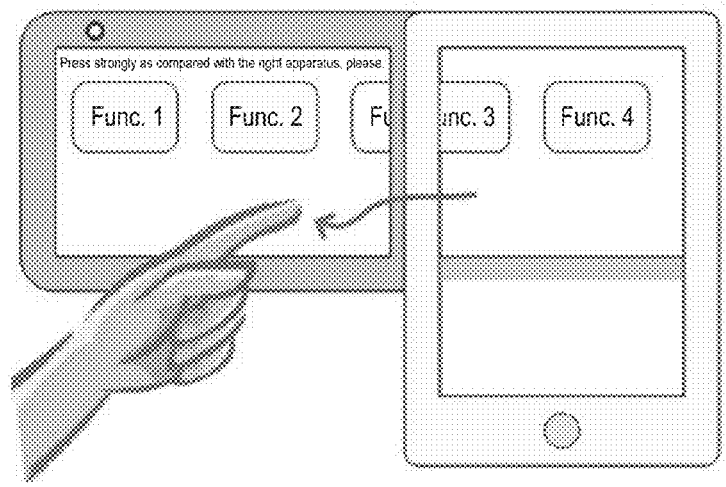
Figure 8:
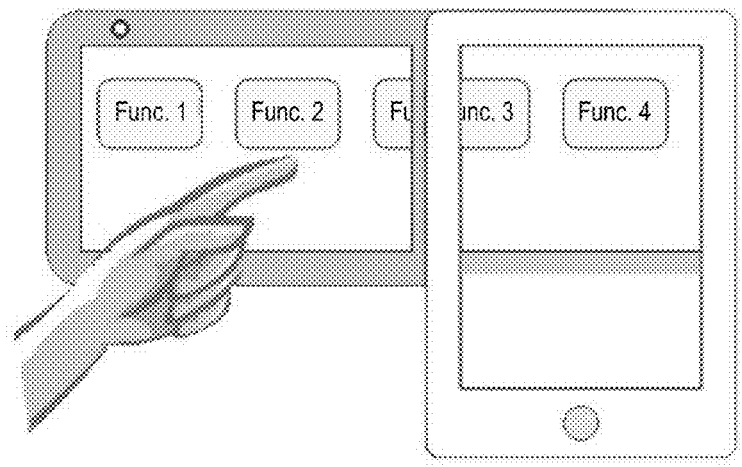
FIG. 8 is a schematic diagram illustrating switching of an object to be operated from an apparatus having a high load reference to an apparatus having a low load reference in a first embodiment of the present invention.
Figure 8:
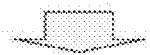
Figure 8:
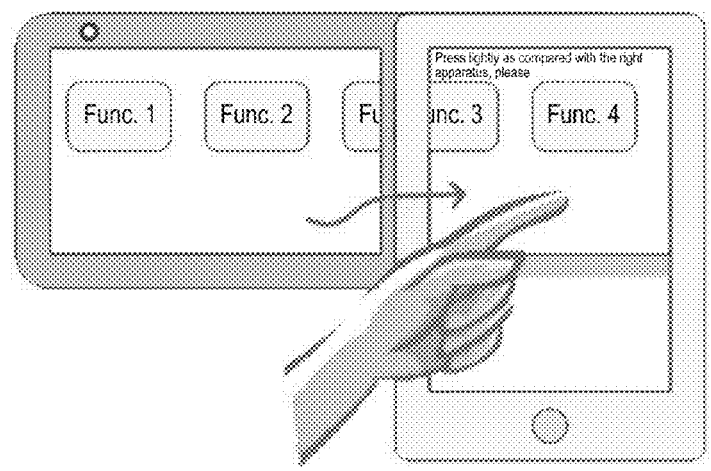

FIG. 6A is a flowchart for explaining one example of a processing procedure of an operation display method of the first embodiment, and FIG. 6B is a diagram subsequent to FIG. 6A. Furthermore, FIG. 6C is a sub-routine flowchart for explaining a process (step S107) of displaying pressing information of FIG. 6A, and FIG. 6D is a sub-routine flowchart for explaining a process (step S110) of displaying pressing information of FIG. 6B. Furthermore, FIG. 7 is a schematic diagram illustrating switching of an object to be operated from an apparatus having a low load reference to an apparatus having a high load reference in the first embodiment. Furthermore, FIG. 8 is a schematic diagram illustrating switching of an object to be operated from an apparatus having a high load reference to an apparatus having a low load reference in the first embodiment.

<Main Routine of Operation Display Method>

As illustrated in FIG. 6A, firstly, it is determined whether there is a communicable portable terminal nearby (step S101). For example, when a distance between the MFP 100 and the portable terminal 200A is within the aforementioned predetermined distance, the control unit 180 determines that there is the communicable portable terminal nearby (step S101: YES) and starts cooperative display with the portable terminal 200A (step S102). The following description will be provided for the case in which the MFP 100 and the portable terminal 200A perform cooperative display. On the other hand, there is no communicable portable terminal nearby (step S101: NO), the control unit 180 waits until a communicable portable terminal comes nearby.

Next, the control unit 180 acquires load references of the MFP 100 and the portable terminal 200A (step S103). The control unit 180 reads a load reference N1 of the touch panel of the operation display unit 160 from the flash ROM of the memory 182 and achieves it. Furthermore, the control unit 240 reads a load reference N2 of the touch panel of the operation display unit 220 from the memory 242 and transmits it through the communication unit 210. The control unit 180 receives the load reference N2 of the touch panel of the operation display unit 220 through the communication unit 140 and achieves it.

Next, the control unit 180 detects an apparatus to be subsequently operated by a user (step S104). The apparatus to be subsequently operated by the user (the second operation display apparatus) is an apparatus different from an apparatus operated by the user most recently (the first operation display apparatus), and is considered as an apparatus in which a user's finger or a touch pen initially touches a touch panel. In more detail, when the user has touched the touch panel, the operation display unit 160 notifies the control unit 180 of the fact that the user has touched the touch panel. Furthermore, when the user has touched the touch panel, the operation display unit 220 notifies the control unit 240 of the fact that the user has touched the touch panel. Then, the control unit 240 notifies the control unit 180 of the fact that the user has touched the touch panel of the operation display unit 220 through the communication unit 210. As described above, the control unit 180 detects the apparatus in which the user's finger or the touch pen has initially touched the touch panel, thereby detecting the second operation display apparatus.

Next, the control unit 180 determines whether an object to be operated has been switched (step S105). When the second operation display apparatus detected in the aforementioned step S104 is equal to the first operation display apparatus, the control unit 180 determines that the object to be operated has not been switched (step S105: NO) and proceeds to a process of step S111.

On the other hand, when the second operation display apparatus detected in step S104 is different from the first operation display apparatus, the control unit 180 determines that the object to be operated has been switched (step S105: YES).

Next, the control unit 180 determines whether the operation object display mode is ON (step S106). The control unit 180 reads setting information of the operation object display mode from the memory 182, and proceeds to a process of step S108 when the operation object display mode is not ON (step S106: NO).

On the other hand, when the operation object display mode is ON (step S106: YES), the control unit 180 displays pressing information (step S107). The pressing information is information on pressing required for an operation of the touch panel of the second operation display apparatus. The control unit 180 displays pressing information in response to the object to be operated. A detailed process of displaying the pressing information will be described later.

Next, as illustrated in FIG. 6B, the control unit 180 determines whether the line-of-sight mode is ON (step S108). The control unit 180 reads setting information of the line-of-sight from the memory 182, and proceeds to the process of step S111 when the line-of-sight is not ON (step S108: NO).

On the other hand, when the line-of-sight mode is ON (step S108: YES), the control unit 180 detects the line-of-sight direction of the user (step S109). The control unit 180 controls the imaging unit 170 to take an image of the eyes of the user, and estimates the line-of-sight direction of the user on the basis of the image result. In addition, since an algorithm for estimating the line-of-sight direction on the basis of the image result of the eyes is well-known, a detailed description thereof will be omitted.

Next, the control unit 180 displays pressing information (step S110). When there is the MFP 100 in front of the estimated line-of-sight direction of the user, the control unit 180 controls the operation display unit 160 to display the pressing information. Alternatively, when there is the portable terminal 200A in front of the estimated line-of-sight direction of the user, the control unit 180 requests the control unit 240 such that the operation display unit 220 displays the pressing information. A detailed process of displaying the pressing information will be described later.

Next, the control unit 180 determines whether the position of a portable terminal to be cooperated has been separated (step S111). When the position of the portable terminal 200A to be cooperated has not been separated beyond the aforementioned predetermined distance with respect to the MFP 100 (step S111: NO), the procedure proceeds to the process of step S104.

On the other hand, when the position of the portable terminal to be cooperated has been separated (step S111: YES), the control unit 180 releases the cooperative display with the portable terminal 200A (step S112) and ends the procedure (end).

<Process (Step S107) of Displaying Pressing Information>

As illustrated in FIG. 6C, firstly, the control unit 180 determines whether an object to be operated is the MFP 100 (step S201). When the object to be cooperated is the MFP 100 (step S201: YES), the control unit 180 determines whether the load reference N1 is larger than the load reference N2 (step S202). When N1 is larger than N2 (step S202: YES), the control unit 180 controls the operation display unit 160 to display strong pressing (step S203). For example, in the example illustrated in FIG. 7, a user intends to perform a flick operation toward the MFP 100 (the load reference N1: high) from the portable terminal 200A (the load reference N2: low). In this case, the control unit 180 controls a message such as "Press strongly as compared with the right apparatus, please" to be displayed on the screen of the operation display unit 160, thereby promoting the user to strongly operate the touch panel of the operation display unit 160. Then, the control unit 180 ends the process of displaying the pressing information and proceeds (returns) to the process of step S108 of the flowchart of FIG. 6B.

On the other hand, when N1 is not larger than N2 (step S202: NO), the control unit 180 determines whether N1 is equal to N2 (step S204). When N1 is equal to N2 (step S204: YES), the control unit 180 ends the process of displaying the pressing information and proceeds (returns) to the process of step S108 of the flowchart of FIG. 6B.

On the other hand, when N1 is not equal to N2 (step S204: NO), that is, when N1 is smaller than N2, the control unit 180 controls the operation display unit 160 to display light pressing (step S205). For example, when a user intends to per forma flick operation toward the MFP 100 (the load reference N1: low) from the portable terminal 200A (the load reference N2: high), the control unit 180 controls the operation display unit 160 to display a message such as "Press lightly as compared with the right apparatus, please". Then, the control unit 180 ends the process of displaying the pressing information and proceeds (returns) to the process of step S108 of the flowchart of FIG. 6B.

On the other hand, when the object to be cooperated is not the MFP 100 (step S201: NO), that is, when the object to be cooperated is the portable terminal 200A, the control unit 180 determines whether N1 is larger than N2 (step S206). When N1 is larger than N2 (step S206: YES), the control unit 240 controls the operation display unit 220 to display light pressing (step S207). For example, in the example illustrated in FIG. 8, a user intends to perform a flick operation toward the portable terminal 200A (the load reference N2: low) from the MFP 100 (the load reference N1: high). In this case, the control unit 240 controls a message such as "Press lightly to flick as compared with the left apparatus, please" to be displayed on the screen of the operation display unit 220. Then, the control unit 180 ends the process of displaying the pressing information and proceeds (returns) to the process of step S108 of the flowchart of FIG. 6B.

On the other hand, when N1 is not larger than N2 (step S206: NO), the control unit 180 determines whether N1 is equal to N2 (step S208). When N1 is equal to N2 (step S208: YES), the control unit 180 ends the process of displaying the pressing information and proceeds (returns) to the process of step S108 of the flowchart of FIG. 6B.

On the other hand, when N1 is not equal to N2 (step S208: NO), that is, when N1 is smaller than N2, the control unit 240 controls the operation display unit 220 to display strong pressing (step S209). For example, when a user intends to perform a flick operation toward the portable terminal 200A (the load reference N2: high) from the MFP 100 (the load reference N1: low), the control unit 240 controls a message such as "Press lightly as compared with the left apparatus, please" to be displayed on the screen of the operation display unit 220. Then, the control unit 180 ends the process of displaying the pressing information and proceeds (returns) to the process of step S108 of the flowchart of FIG. 6B.

<Process (Step S110) of Displaying Pressing Information>

As illustrated in FIG. 6D, firstly, the control unit 180 determines whether a line-of-sight target is the MFP 100 (step S301). When the line-of-sight target is the MFP 100 (step S301: YES), the control unit 180 determines whether N1 is larger than N2 (step S302). When N1 is larger than N2 (step S302: YES), the control unit 180 controls the operation display unit 160 to display strong pressing (step S303). Then, the control unit 180 ends the process of displaying the pressing information and proceeds (returns) to the process of step S111 of the flowchart of FIG. 6B.

On the other hand, when N1 is not larger than N2 (step S302: NO), the control unit 180 determines whether N1 is equal to N2 (step S304). When N1 is equal to N2 (step S304: YES), the control unit 180 ends the process of displaying the pressing information and proceeds (returns) to the process of step S111 of the flowchart of FIG. 6B.

On the other hand, when N1 is not equal to N2 (step S304: NO), that is, when N1 is smaller than N2, the control unit 180 controls the operation display unit 160 to display light pressing (step S305). Then, the control unit 180 ends the process of displaying the pressing information and proceeds (returns) to the process of step S111 of the flowchart of FIG. 6B.

On the other hand, when the line-of-sight target is not the MFP 100 (step S301: NO), that is, when the line-of-sight target is the portable terminal 200A, the control unit 180 determines whether N1 is larger than N2 (step S306). When N1 is larger than N2 (step S306: YES), the control unit 240 controls the operation display unit 220 to display light pressing (step S307).

On the other hand, when N1 is not larger than N2 (step S306: NO), the control unit 180 determines whether N1 is equal to N2 (step S308). When N1 is equal to N2 (step S308: YES), the control unit 180 ends the process of displaying the pressing information and proceeds (returns) to the process of step S111 of the flowchart of FIG. 6B.

On the other hand, when N1 is not equal to N2 (step S308: NO), that is, when N1 is smaller than N2, the control unit 240 controls the operation display unit 220 to display strong pressing (step S309). Then, the control unit 180 ends the process of displaying the pressing information and proceeds (returns) to the process of step S111 of the flowchart of FIG. 6B.

As described above, one example of the processing procedure of the operation display method of the present embodiment has been described with reference to FIG. 6A to FIG. 6D, FIG. 7, and FIG. 8. In the aforementioned operation display method, the control unit 180 acquires load references of an apparatus operated by a user most recently and an apparatus to be subsequently operated among the MFP 100 and the portable terminal apparatuses 200A, 200B, and 200C, and compares the load references with each other. Then, as a result obtained by comparing the load references with each other, when there is a difference in the load references, the control unit 180 controls the degree of a change in pressing force for pressing the touch panel of the aforementioned apparatus to be subsequently operated to be displayed.

(Modification)

In one example of the above-described operation display method, the case has been described in which the degree of a change in the pressing force for pressing the touch panel of the operation display apparatus to be subsequently operated is notified to the operation display unit 160 or the operation display unit 220 by using a language of "strong" or "weak". However, the degree of a change in the aforementioned pressing force can also be displayed using other expressing methods without notifying it by using a language. Hereinafter, with reference to FIG. 9A and FIG. 9B, other examples of notifying the degree of a change in the aforementioned pressing force will be described.

Figure 9A:
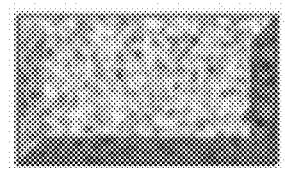
FIG. 9A is a schematic diagram illustrating one example of visually expressing the degree of a change in pressing force in a first embodiment of the present invention.
Figure 9B:
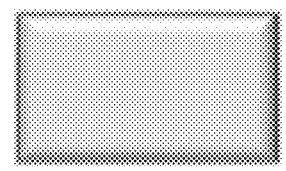
FIG. 9B is a schematic diagram illustrating another example of visually expressing the degree of a change in pressing force in a first embodiment of the present invention.

FIG. 9A is a schematic diagram illustrating one example of visually expressing the degree of a change in pressing force in the first embodiment, and FIG. 9B is a schematic diagram illustrating another example of visually expressing the degree of a change in pressing force.

As illustrated in FIG. 9A, an operation object (for example, a button) to be displayed is expressed with a hard image such as an "uneven stone", so that it is possible to notify a user that it is necessary to strongly operate a touch panel with a high load reference.

On the other hand, as illustrated in FIG. 9B, a button is expressed with a smooth (soft) image, so that it is possible to notify a user that it is necessary to lightly operate a touch panel with a low load reference.

Furthermore, instead of notifying the degree of a change in pressing force by displaying a language or an image on the operation display unit 160 or the operation display unit 220, the degree of a change in pressing force may also be notified to a user through sound or voice by using a speaker embedded in the MFP 100 or the portable terminal 200A.

The operation display system, the operation display apparatus, and the operation display program of the present embodiment as described above have the following effects.

As a comparison result of the load references of the first operation display apparatus operated by a user most recently and the second operation display apparatus to be subsequently operated, when there is a difference between them, the degree of a change in pressing force for pressing the touch panel of the aforementioned second operation display apparatus is notified. Consequently, a difference between the load references of the first operation display apparatus and the second operation display apparatus is recognized by a user, so that it is possible to reduce a burden of the user due to a difference of operability caused by the difference between the load references of the first operation display apparatus and the second operation display apparatus.

In detail, when an object to be operated is switched from an apparatus with a weak load reference to an apparatus with a strong load reference, a user is notified of the fact that strongly pressing is advantageous, so that it is possible to prevent the user from lightly pressing a touch panel of the apparatus with the strong load reference similarly to the apparatus with the weak load reference. Consequently, the touch operation of the user is prevented from not being recognized as an operation, which is caused when the user lightly presses the touch panel of the apparatus with the strong load reference.

Furthermore, since the apparatus with the weak load reference can be operated at pressing force weaker than that of the apparatus with the strong load reference, a user normally feels that it is easy to operate in many cases. However, when a user strongly presses the touch panel of the apparatus with the weak load reference, the advantage of the apparatus with the weak load reference that it is easy to operate is not utilized, and it is also probable that the touch panel will be damaged. In the present embodiment, when an object to be operated is switched from the apparatus with the strong load reference to the apparatus with the weak load reference, a user is notified of the fact that lightly pressing is advantageous, so that it is possible to prevent the user from strongly pressing the touch panel of the apparatus with the weak load reference similarly to the apparatus with the strong load reference.

Furthermore, only when there is a difference in load references, that is, only when notification is required, a user is notified of the degree of a change in the load references, that is, "strong" when a low load reference is changed to a high load reference, or "weak" when a high load reference is changed to a low load reference. Consequently, a user can know pressing information at an optimal timing and can accurately determine whether to press a touch panel at strong pressing force or weak pressing force as compared with a load reference up to now.

Second Embodiment

In the first embodiment, the case has been described in which the degree of a change in pressing force for pressing touch panels between operation display apparatuses with different load references is notified.

In a second embodiment, the following description will be provided for the case in which as a result of a screen operation by a user between operation display apparatuses with different load references, when an operation object has been displayed across two operation display apparatuses, the operation object is moved to an apparatus with a weak load reference. Moreover, the following description will be provided for the case of notifying the degree of a change in pressing force for pressing touch panels. Hereinafter, in order to avoid a redundancy, a description of a configuration equal to that of the first embodiment will be omitted.

Figure 10A:
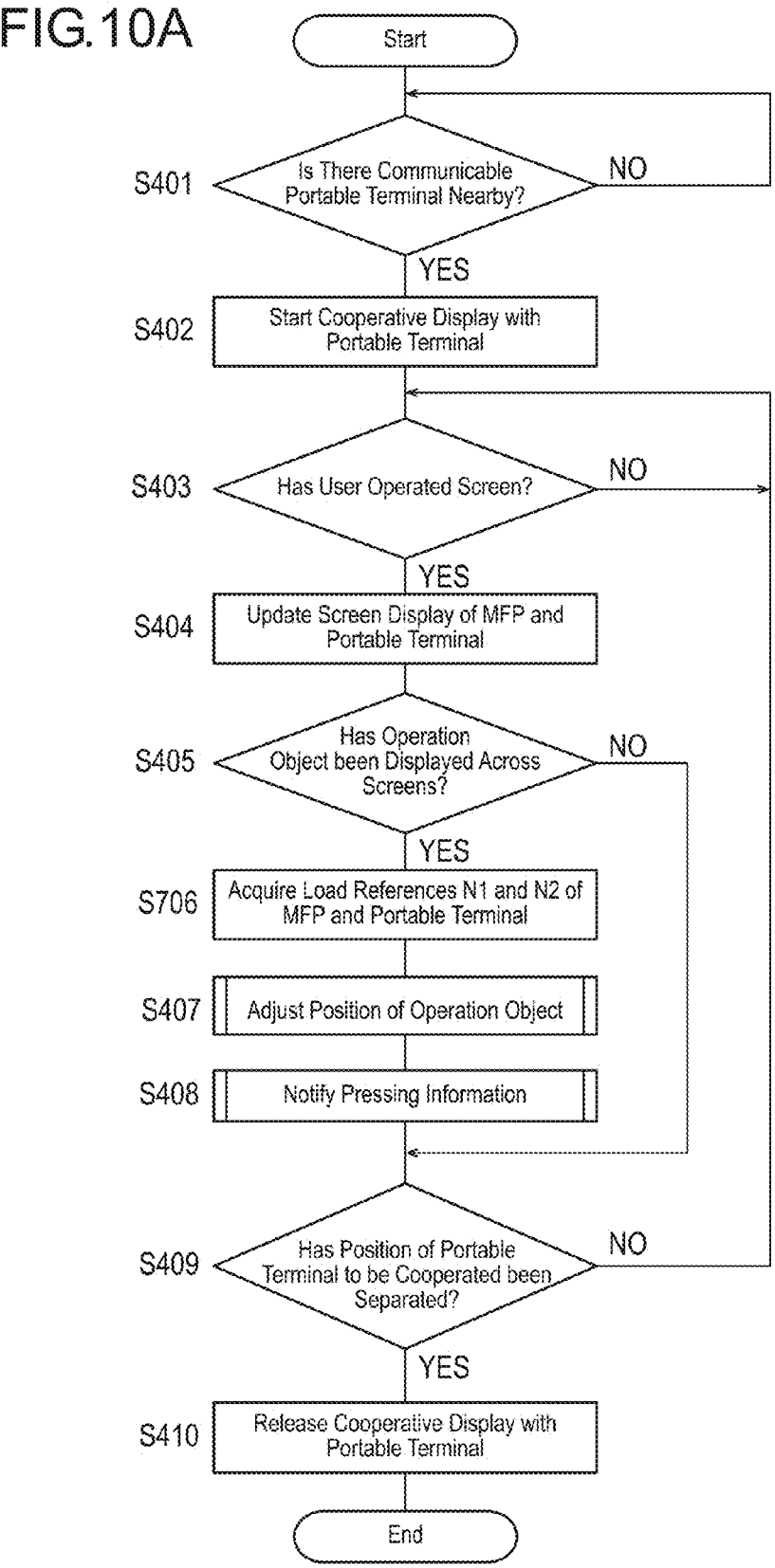
FIG. 10A is a flowchart for explaining one example of a processing procedure of an operation display method in a second embodiment of the present invention.
Figure 11:
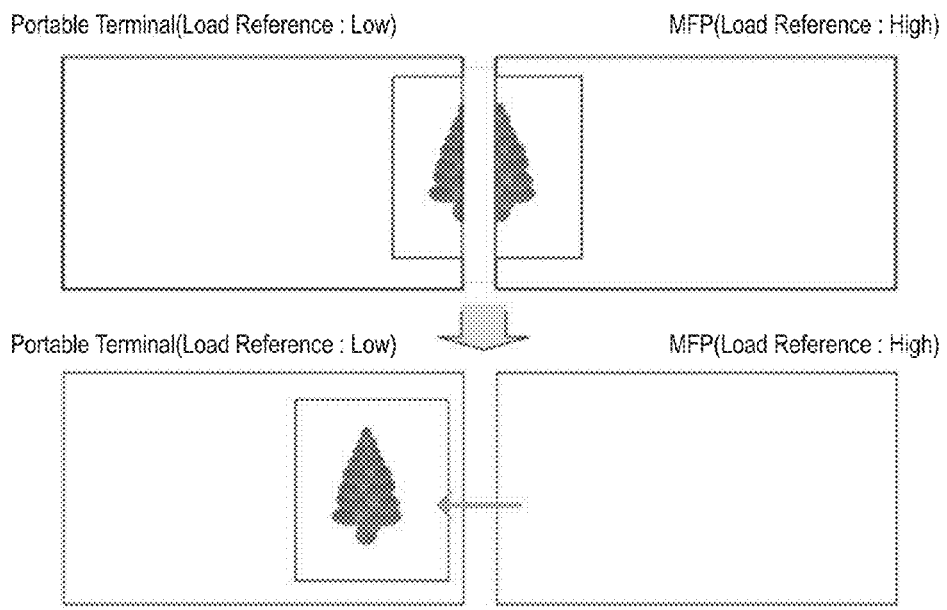
FIG. 11 is a schematic diagram for explaining position adjustment of an operation object in a second embodiment of the present invention.
Figure 12:
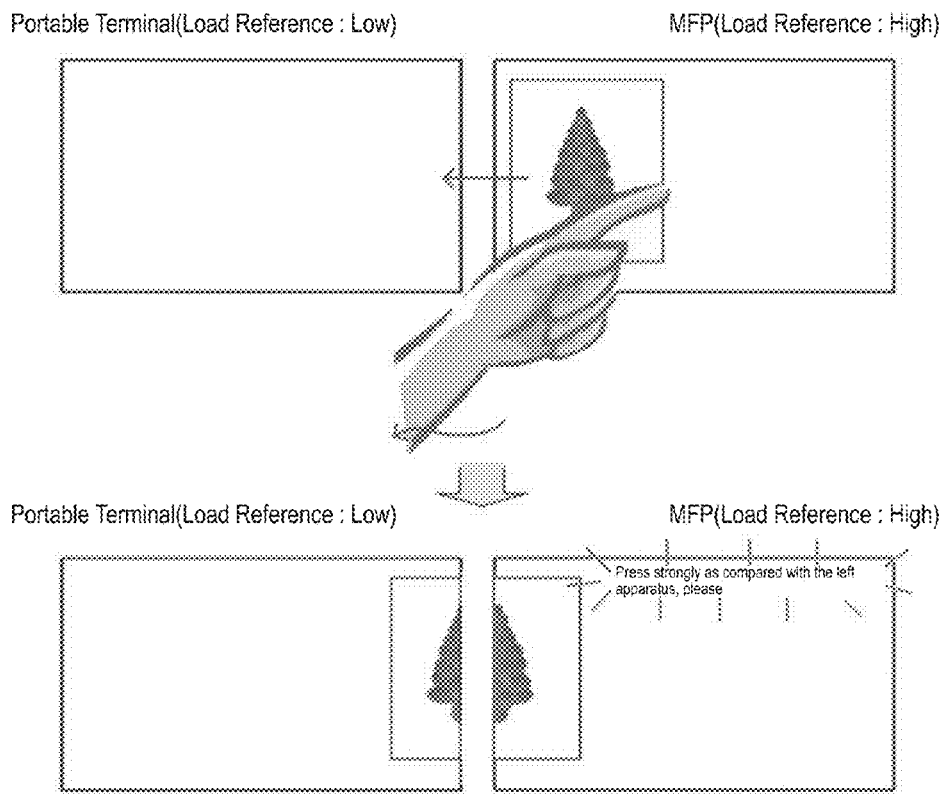
FIG. 12 is a schematic diagram for explaining notification of pressing information in a second embodiment of the present invention.

FIG. 10A is a flowchart for explaining one example of a processing procedure of an operation display method in the second embodiment. Furthermore, FIG. 10B is a sub-routine flowchart for explaining a process (step S407) of adjusting a position of an operation object of FIG. 10A, and FIG. 10C is a sub-routine flowchart for explaining a process (step S408) of notifying pressing information of FIG. 10A. Furthermore, FIG. 11 is a schematic diagram for explaining position adjustment of an operation object in the second embodiment, and FIG. 12 is a schematic diagram for explaining notification of pressing information in the second embodiment.

<Main Routine of Operation Display Method>

As illustrated in FIG. 10A, firstly, the control unit 180 determines whether there is a communicable portable terminal nearby (step S401). When a distance between the MFP 100 and the portable terminal 200A is within the aforementioned predetermined distance, the control unit 180 determines that there is a communicable portable terminal nearby (step S401: YES) and starts cooperative display with the portable terminal 200A (step S402). The following description will be provided for the case in which the MFP 100 and the portable terminal 200A perform cooperative display. On the other hand, when there is no communicable portable terminal nearby (step S401: NO), the control unit 180 waits until a communicable portable terminal comes nearby.

Next, the control unit 180 determines whether a user has operated a screen (step S403). The control unit 180 determines whether the user has operated a screen of the operation display unit 160. Furthermore, the control unit 240 determines whether the user has operated a screen of the operation display unit 220. When the user has operated at least one of the screens of the operation display unit 160 and the operation display unit 220 (step S403: YES), the screen display of the MFP 100 and the portable terminal 200A are updated (step S404).

Next, the control unit 180 determines whether an operation object has been displayed across the screens (step S405). When the operation object has not been displayed across the screens of the MFP 100 and the portable terminal 200A (step S405: NO), the procedure proceeds to a process of step S409.

On the other hand, when the operation object has been displayed across the screens of the MFP 100 and the portable terminal 200A (step S405: YES), load references N1 and N2 of the MFP 100 and the portable terminal 200A are acquired (step S406). Since an acquisition method of the load references N1 and N2 is equal to that of the first embodiment, a description thereof will be omitted.

Next, the position of the operation object is adjusted (step S407). In response to a comparison result of the load references N1 and N2, the control unit 180 moves the operation object displayed across the screens of the MFP 100 and the portable terminal 200A such that the operation object is within a screen of an apparatus with a weak load reference. A detailed process of adjusting the position of the operation object will be described later.

Next, the control unit 180 notifies pressing information (step S408). In response to the comparison result of the load references N1 and N2, the control unit 180 allows the operation display unit 160 or the operation display unit 220 to display the pressing information. A detailed process of notifying the pressing information will be described later.

Next, the control unit 180 determines whether the position of the portable terminal 200A to be cooperated has been separated (step S409). When the position of the portable terminal 200A to be cooperated has not been separated beyond the aforementioned predetermined distance (step S409: NO), the procedure proceeds to the process of step S403.

On the other hand, when the position of the portable terminal 200A to be cooperated has been separated (step S409: YES), the control unit 180 releases the cooperative display with the portable terminal 200A (step S410) and ends the procedure (end).

<Process (Step S407) of Adjusting Position of Operation Object>

As illustrated in FIG. 10B, the control unit 180 determines whether an automatic shift mode is ON (step S501). The control unit 180 reads setting information of the automatic shift mode from the memory 182, and when the automatic shift mode is not ON (step S501: NO), the control unit 180 ends the process of the position adjustment of the operation object and proceeds (returns) to the process of step S408 of FIG. 10A.

On the other hand, when the automatic shift mode is ON (step S501: YES), the control unit 180 determines whether the load reference N1 is larger than the load reference N2 (step S502). When N1 is larger than N2 (step S502: YES), the control unit 180, for example, moves (shifts) an operation object (an icon) of a "tree image" such that the operation object is within the screen of the portable terminal 200A (the load reference N2: low) as illustrated in FIG. 11 (step S503).

On the other hand, when N1 is not larger than N2 (step S502: NO), the control unit 180 determines whether N1 is equal to N2 (step S504). When N1 is equal to N2 (step S504: YES), the control unit 180 ends the process of the position adjustment of the operation object and proceeds (returns) to the process of step S408 of FIG. 10A.

On the other hand, when N1 is not equal to N2 (step S504: NO), that is, when N1 is smaller than N2, the control unit 180 moves (shifts) the operation object to be within the screen of the MFP 100 (the load reference N1: low) (step S505). Then, the control unit 180 ends the process of the position adjustment of the operation object and proceeds (returns) to the process of step S408 of FIG. 10A.

<Process (Step S408) of Notifying Pressing Information>

As illustrated in FIG. 10C, the control unit 180 determines whether a notification mode is ON (step S601). The control unit 180 reads setting information of the notification mode from the memory 182, and when the notification mode is not ON (step S601: NO), the control unit 180 ends the process of notifying the pressing information and proceeds (returns) to the process of step S409 of FIG. 10A.

On the other hand, when the notification mode is ON (step S601: YES), the control unit 180 determines whether the load reference N1 is larger than the load reference N2 (step S602). When N1 is larger than N2 (step S602: YES), the control unit 180 controls the operation display unit 160 to display strong pressing (step S603). For example, in an example illustrated in FIG. 12, as a result obtained when a user has performed a flick operation toward the portable terminal 200A (the load reference N2: low) from the MFP 100 (the load reference N1: high), the operation object of the "tree image" has been displayed across the MFP 100 and the portable terminal 200A. In this case, the control unit 180 allows a message such as "Press strongly as compared with the left apparatus, please" to be displayed on the screen of the operation display unit 160, thereby promoting a user to strongly press the touch panel of the operation display unit 160. Then, the control unit 180 ends the process of notifying the pressing information and proceeds (returns) to the process of step S409 of FIG. 10A.

On the other hand, when N1 is not larger than N2 (step S602: NO), the control unit 180 determines whether N1 is equal to N2 (step S604). When N1 is equal to N2 (step S604: YES), the control unit 180 ends the process of notifying the pressing information and proceeds (returns) to the process of step S409 of FIG. 10A.

On the other hand, when N1 is not equal to N2 (step S604: NO), that is, when N1 is smaller than N2, the control unit 240 controls the operation display unit 220 to display strong pressing (step S605). Then, the control unit 180 ends the process of notifying the pressing information and proceeds (returns) to the process of step S409 of FIG. 10A.

As described above, with reference to FIG. 10A to FIG. 10C, FIG. 11, and FIG. 12, one example of the processing procedure of the operation display method of the present embodiment has been described. In the aforementioned operation display method, the control unit 180 acquires the load references of the MFP 100 (a self-apparatus) and the portable terminal 200A (another operation display apparatus) and compares the load references with each other. Then, when an operation object has been displayed across the screen of the MFP 100 and the screen of the portable terminal 200A, the control unit 180 changes display control in response to a result obtained by comparing the load reference N1 of the MFP 100 with the load reference N2 of the portable terminal 200A. In detail, the control unit 180 moves the operation object so as to be within the screen of an apparatus with a weak load reference. Moreover, the control unit 180 controls the operation display unit 160 or the operation display unit 220 to notify the degree of a change in pressing force for pressing a touch panel.

The operation display system, the operation display apparatus, and the operation display program of the present embodiment as described above have the following effects.

When an operation object has been displayed across operation display apparatuses with different load references, the operation object is moved so as to be within the screen of an apparatus with a weak load reference, so that it is easy to perform a multi-touch operation such as pinch-in and pinch-out. Furthermore, a difference in the load references of the operation display apparatuses is recognized by a user, so that it is possible to reduce a burden of the user due to a difference of operability caused by the difference between the load references.

Third Embodiment

In the second embodiment, the case has been described in which as a result of a screen operation by a user between operation display apparatuses with different load references, when an operation object has been displayed across them, the operation object is moved to an apparatus with a weak load reference. Furthermore, the case in which the degree of a change in pressing force for pressing a touch panel is notified has been described.

In a third embodiment, the following description will be provided for the case in which when an operation object has been displayed across operation display apparatuses with different load references, information on an operation of a touch panel is notified if a finger, etc., of a user have touched an operation object of each operation display apparatus. Moreover, the following description will be provided for the case in which the operation object is moved to an apparatus with a weak load reference when the finger, etc., of the user have touched the operation object of each operation display apparatus. Hereinafter, in order to avoid a redundancy, a description of a configuration equal to those of the first and second embodiments will be omitted.

Figure 13B:
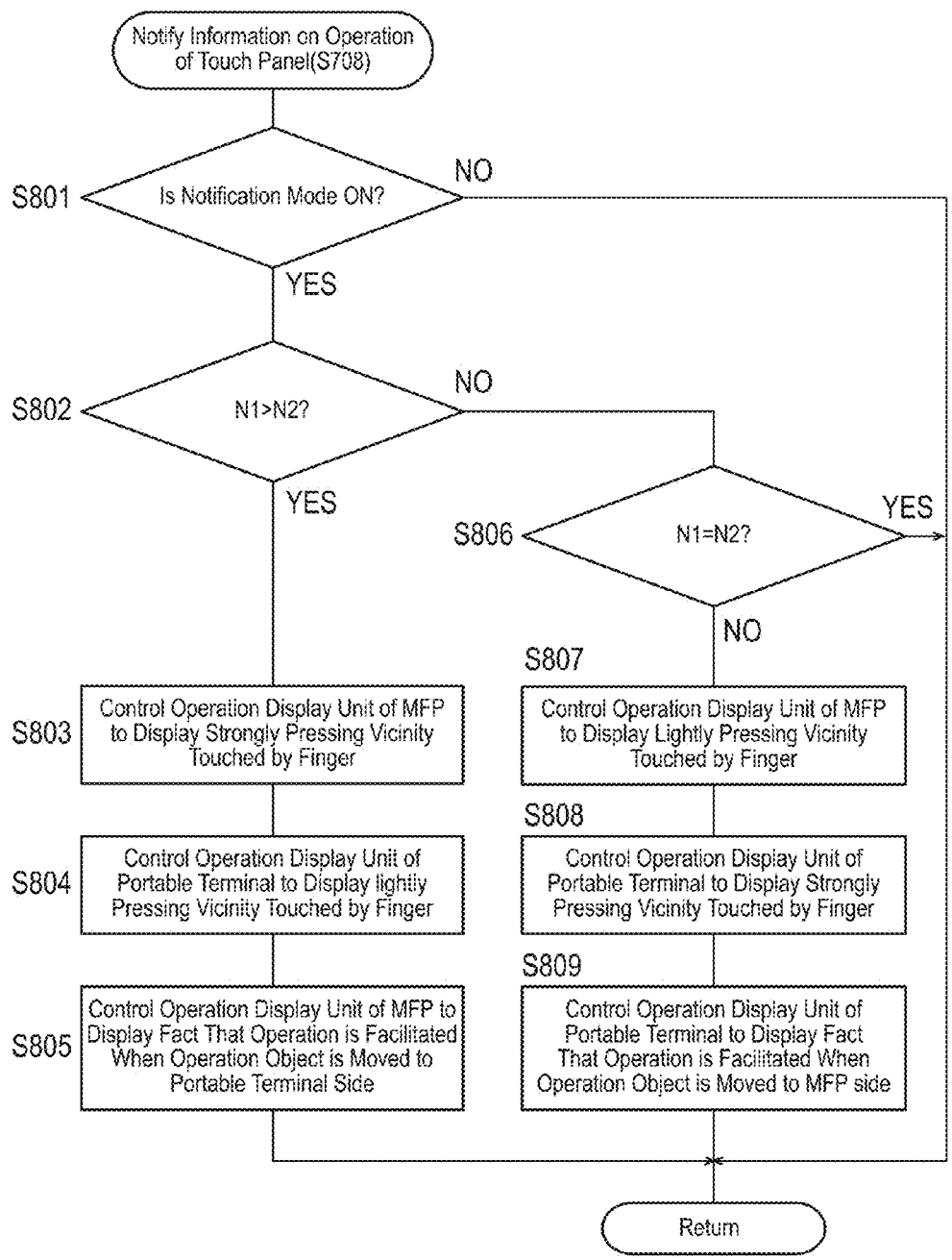
FIG. 13B is a sub-routine flowchart for explaining a process (step S708) of notifying pressing information of FIG. 13A.
Figure 14:
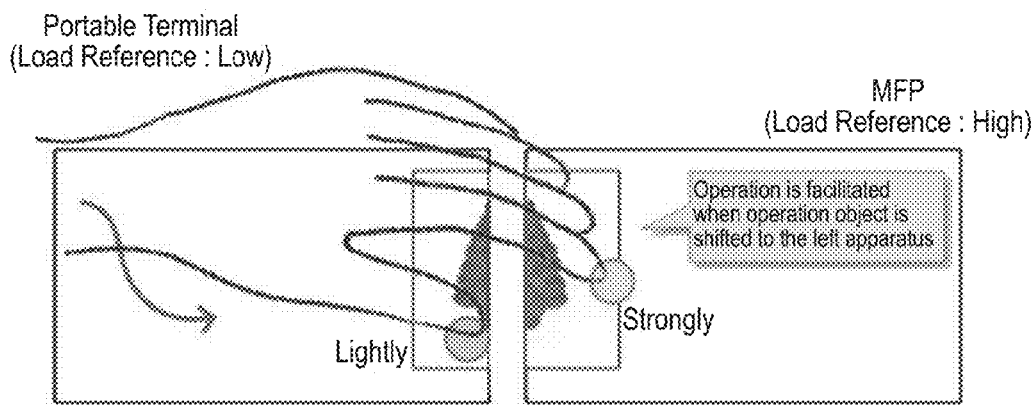
FIG. 14 is a schematic diagram for explaining notification of pressing information in a third embodiment of the present invention.

FIG. 13A is a flowchart for explaining one example of a processing procedure of an operation display method in the third embodiment. Furthermore, FIG. 13B is a sub-routine flowchart for explaining a process (step S708) of notifying pressing information of FIG. 13A. Furthermore, FIG. 14 is a schematic diagram for explaining of notification of the pressing information in the third embodiment.

<Main Routine of Operation Display Method>

Processes of steps S701 to S706 in FIG. 13A are equal to those of steps S401 to S406 in FIG. 10A of the second embodiment. Consequently, in order to avoid a redundancy, a detailed description of the processes of steps S701 to S706 will be omitted.

In step S707, in the state in which an operation object has been displayed across the operation display apparatuses, it is determined whether a finger, etc., of a user have touched an operation object of each apparatus. The control unit 180, for example, determines whether a thumb and a forefinger of a user have touched operation objects of the MFP 100 and the portable terminal 200A, respectively. When the finger, etc., of the user have not touched the operation object of each apparatus (step S707: NO), the procedure proceeds to the process of step S703.

On the other hand, when the finger, etc., of the user have touched the operation object of each apparatus (step S707: YES), the control unit 180 notifies pressing information (step S708). In response to a comparison result of the load references N1 and N2, the control unit 180 notifies the pressing information and information on the operation of the touch panel. A detailed process of notifying the pressing information will be described later.

Next, the position of the operation object is adjusted (step S709). Since the process of the position adjustment of the operation object is similar to the process illustrated in FIG. 10B of the second embodiment, a detailed description will be omitted.

Next, the control unit 180 determines whether the position of the portable terminal 200A to be cooperated has been separated (step S710). When the position of the portable terminal 200A to be cooperated has not been separated beyond the aforementioned predetermined distance (step S710: NO), the control unit 180 proceeds to the process of step S703.

On the other hand, when the position of the portable terminal 200A to be cooperated has been separated (step S710: YES), the control unit 180 releases the cooperative display with the portable terminal 200A (step S711) and ends the procedure (end).

<Process (Step S708) of Notifying Pressing Information>

As illustrated in FIG. 13B, the control unit 180 determines whether a notification mode is ON (step S801). The control unit 180 reads setting information of the notification mode from the memory 182, and when the notification mode is not ON (step S801: NO), the control unit 180 ends the process of notifying the pressing information and proceeds (returns) to the process of step S709 of FIG. 13A.

On the other hand, when the notification mode is ON (step S801: YES), the control unit 180 determines whether the load reference N1 is larger than the load reference N2 (step S802). When N1 is larger than N2 (step S802: YES), the control unit 180 controls the operation display unit 160 to display strongly pressing the vicinity touched by a finger (step S803). Furthermore, the control unit 240 controls the operation display unit 220 to display lightly pressing the vicinity touched by a finger (step S804). Moreover, the control unit 180 controls the operation display unit 160 to display the fact that an operation is facilitated when the operation object is moved to the portable terminal 200A side (step S805). For example, as illustrated in FIG. 14, when a user's thumb has touched the portable terminal 200A and the user's forefinger has touched the MFP 100, the control unit 180 controls messages such as "strongly" and "lightly" to be displayed in the vicinity of the forefinger and the thumb, respectively. Furthermore, the control unit 180, for example, controls the operation display unit 160 to display a message such as "Operation is facilitated when operation object is shifted to the left apparatus" in the vicinity of a part touched by a finger. The aforementioned message may also use a pop-up or may also be a character string. Then, the control unit 180 ends the process of notifying the pressing information and proceeds (returns) to the process of step S709 of FIG. 13A.

On the other hand, when N1 is not larger than N2 (step S802: NO), the control unit 180 determines whether N1 is equal to N2 (step S806). When N1 is equal to N2 (step S806: YES), the control unit 180 ends the process of notifying the pressing information and proceeds (returns) to the process of step S709 of FIG. 13A.

On the other hand, when N1 is not equal to N2 (step S806: NO), that is, when N1 is smaller than N2, the control unit 180 controls the operation display unit 160 to display lightly pressing the vicinity touched by a finger (step S807). Furthermore, the control unit 240 controls the operation display unit 220 to display strongly pressing the vicinity touched by a finger (step S808). Moreover, the control unit 180 controls the operation display unit 220 to display the fact that an operation is facilitated when the operation object is moved to the MFP 100 side. Then, the control unit 180 ends the process of notifying the pressing information and proceeds (returns) to the process of step S709 of FIG. 13A.

As described above, with reference to FIG. 13A, FIG. 13B, and FIG. 14, one example of the processing procedure of the operation display method of the present embodiment has been described. In the aforementioned operation display method, the control unit 180 acquires the load references of the MFP 100 (a self-apparatus) and the portable terminal 200A (another operation display apparatus) and compares the load references with each other. When an operation object has been displayed across the screen of the MFP 100 and the screen of the portable terminal 200A and a finger, etc., of a user have touched the operation object of each operation display apparatus, pressing information and information on an operation of a touch panel are notified in response to a comparison result of load references. Moreover, the operation object is moved so as to be within the screen of an apparatus with a weak load reference.

The operation display system, the operation display apparatus, and the operation display program of the present embodiment as described above have the following effects.

Information on an operation of a touch panel is notified, so that it is possible to reduce a burden of a user due to a difference of operability caused by the difference in the load references of operation display apparatuses. Furthermore, an operation object is moved so as to be within the screen of an apparatus with a weak load reference, so that it is easy to perform a multi-touch operation such as pinch-in and pinch-out.

The present invention is not limited only to the above-described embodiments and various modifications can be made within the scope of the appended claims. For example, in the above-described first embodiment, the case has been described in which an apparatus, which is different from an apparatus operated by a user most recently and has a touch panel to be initially touched by a user's finger or a touch pen, is employed as an apparatus to be subsequently operated by the user. However, the present invention is not limited to such a case, and it is also possible to take an image of a user's finger or a touch pen approaching an operation display unit by using an imaging unit and to detect an apparatus intended to be subsequently operated by a user by image analysis on the basis of the image result. According to such a configuration, a control unit can allow pressing information to be displayed on the operation display unit before a user touches a touch panel. As a consequence, a user can confirm the pressing information and then start a touch operation with a sufficient temporal margin, so that it is possible to reduce a burden of the user due to a difference of operability caused by a difference of load references.

Furthermore, in the above-described first to third embodiments, the case has been described in which the MFP and the portable terminal perform an operation display method in cooperation with each other and the MFP plays a leading role in a relation between the MFP and the portable terminal. However, the present invention is not limited to such a case, and for example, it may be possible to employ a configuration in which a server, the MFP and the portable terminal perform an operation display method in cooperation with one another and the server plays a leading role in a relation among the server, the MFP, and the portable terminal. That is, the server may also be configured to have a control function of acquiring load references to be compared and allowing pressing information to be displayed on the operation display units of the MFP and the portable terminal.

Furthermore, in the above-described first to third embodiments, the case has been described in which there is a difference between load references of capacitive type and resistive-film type touch panels. However, the present invention is not limited to such a case, and can also be applied to the case in which there is a difference between load references of capacitive type touch panels, resistive-film type touch panels, or other types of touch panels.

Furthermore, in the above-described first to third embodiments, the case has been described in which a capacitive type touch panel is easy to operate as compared with a resistive-film type touch panel. However, there may be a case in which a resistive-film type touch panel is easy to operate by peripheral environments and use conditions of a touch panel. For example, when a user performs an operation while wearing a glove or performs an operation with a dry finger, it is possible to promote the use of an operation display apparatus including a resistive-film type touch panel as compared with a capacitive type touch panel.

Furthermore, in the above-described first to third embodiments, the case has been described in which two operation display apparatuses with difference load references perform cooperative display. However, the present invention is not limited to such a case, and can also be applied to the case in which operation display apparatuses do not perform cooperative display.

What is claimed is:

1. An operation display system comprising:
a plurality of operation display apparatuses each including a touch panel; and
a hardware processor configured to:
acquire load references of the respective touch panels of the plurality of operation display apparatuses, the load references serving as a reference of pressing force by which the respective corresponding touch panels receive an operation,
compare the acquired load references of a first operation display apparatus and a second operation display apparatus among the plurality of operation display apparatuses, with each other, and
in a case in which it is determined based on a result of the comparison that there is a difference between the load references, control a degree of a change in pressing force for pressing the touch panel of the second operation display apparatus as compared to the pressing force for pressing the touch panel of the first operation display apparatus, to be indicated in an output notification, the first operation display apparatus being an operation display apparatus operated by a user most recently among the plurality of operation display apparatuses and the second operation display apparatus being an operation display apparatus to be subsequently operated among the plurality of operation display apparatuses.

2. The operation display system as claimed in claim 1, wherein the hardware processor controls the degree of the change in the pressing force to be displayed on a screen of any one of the plurality of operation display apparatuses, to thereby output the notification.

3. The operation display system as claimed in claim 2, wherein the hardware processor controls the degree of the change in the pressing force to be displayed on a screen of the second operation display apparatus, to thereby output the notification.

4. The operation display system as claimed in claim 2, further comprising:
a line-of-sight detector for detecting a line-of-sight of a user,
wherein, on a basis of a detection result of the line-of-sight detector, the hardware processor displays the degree of the change in the pressing force on a screen of an operation display apparatus currently viewed by a user among the plurality of operation display apparatuses, to thereby output the notification.

5. The operation display system as claimed in claim 1, wherein, in response to a result of the comparison indicating that there is a difference between the load references, the hardware processor controls a degree of pressing force for pressing the touch panels of the first and second operation display apparatuses to be indicated in the output notification.

6. The operation display system as claimed in claim 1, wherein the hardware processor is included in the first operation display apparatus or the second operation display apparatus.

7. The operation display system as claimed in claim 1, wherein the first operation display apparatus performs cooperative display with the second operation display apparatus.

8. The operation display system as claimed in claim 1,
wherein the load references serve as a reference of a minimum pressing force that is necessary for deciding that the respective corresponding touch panels receive an operation,
wherein the hardware processor determines that an operation is received via any one of the touch panels only in a case in which a pressing force on said any one of the touch panels is equal to or greater than the corresponding load reference of said any one of the touch panels,
wherein the load references are stored in advance in a memory of the corresponding operation display apparatus, and
wherein the hardware processor acquires the load references from the corresponding memories.

9. An operation display system comprising:
a plurality of operation display apparatuses each including a touch panel; and
a hardware processor configured to:
acquire load references of the respective touch panels of the plurality of operation display apparatuses, the load references serving as a reference of a minimum pressing force that is necessary for deciding that the respective corresponding touch panels receive an input operation, wherein the hardware processor determines that an input operation is received via any one of the touch panels only in a case in which a pressing force on said any one of the touch panels is equal to or greater than the corresponding load reference of said any one of the touch panels, wherein the load references are stored in advance in a memory of the corresponding operation display apparatus, and wherein the hardware processor acquires the load references from the corresponding memories,
compare the acquired load references of a first operation display apparatus and a second operation display apparatus among the plurality of operation display apparatuses, with each other, and
control display control for displaying an operation object to be changed in response to a result of the comparison, when the operation object has been displayed across a screen of the first operation display apparatus and a screen of the second operation display apparatus.

10. The operation display system as claimed in claim 9, wherein, in response to a result of the comparison, the hardware processor controls the operation object to be moved for display such that an entirety of the operation object is viewed on a screen of an operation display apparatus with a weaker load reference among the first operation display apparatus and the second operation display apparatus.

11. The operation display system as claimed in claim 9, wherein, in response to a result of the comparison indicating that there is a difference between the acquired load references, the hardware processor controls a degree of pressing force for pressing the touch panels of the first and second operation display apparatuses to be indicated in an output notification.

12. The operation display system as claimed in claim 9, wherein the hardware processor is included in the first operation display apparatus or the second operation display apparatus.

13. The operation display system as claimed in claim 9, wherein the first operation display apparatus performs cooperative display with the second operation display apparatus.

14. An operation display system comprising:
a plurality of operation display apparatuses each including a touch panel; and
a hardware processor configured to:
acquire load references of the respective touch panels of the plurality of operation display apparatuses, the load references serving as a reference of a minimum pressing force that is necessary for deciding that the respective corresponding touch panels receive an input operation, wherein the hardware processor determines that an input operation is received via any one of the touch panels only in a case in which a pressing force on said any one of the touch panels is equal to or greater than the corresponding load reference of said any one of the touch panels, wherein the load references are stored in advance in a memory of the corresponding operation display apparatus, and wherein the hardware processor acquires the load references from the corresponding memories,
compare the acquired load references of a first operation display apparatus and a second operation display apparatus among the plurality of operation display apparatuses, with each other, and
control information on an operation of at least one of the touch panels to be indicated in an output notification, in response to a result of the comparison, in a state in which an operation object has been displayed across a screen of the first operation display apparatus and a screen of the second operation display apparatus, when the operation object of each screen has been touched.

15. The operation display system as claimed in claim 14, wherein, in response to a result of the comparison, the hardware processor controls the operation object to be moved for display such that an entirety of the operation object is viewed on a screen of an operation display apparatus with a weaker load reference among the first operation display apparatus and the second operation display apparatus.

16. The operation display system as claimed in claim 14, wherein, in response to a result indicating that there is a difference between the acquired load references, the hardware processor controls a degree of pressing force for pressing touch panels of the first and second operation display apparatuses to be indicated in the output notification.

17. The operation display system as claimed in claim 14, wherein the hardware processor is included in the first operation display apparatus or the second operation display apparatus.

18. The operation display system as claimed in claim 14, wherein the first operation display apparatus performs cooperative display with the second operation display apparatus.

19. An operation display apparatus comprising:
a touch panel; and
a hardware processor configured to:
acquire a first load reference serving as a reference of pressing force by which the touch panel receives an operation and a second load reference serving as a reference of pressing force by which a touch panel of another operation display apparatus operated by a user most recently receives an operation,
compare the first load reference and the second load reference with each other, and
in a case in which it is determined based on a result of the comparison that there is a difference between the first load reference and the second load reference and it is determined that the user intends to subsequently operate the operation display apparatus after having most recently operated said another operation display apparatus, control a degree of a change in pressing force for pressing the touch panel of the operation display apparatus to be indicated in an output notification.

20. An operation display apparatus comprising:
a touch panel; and
a hardware processor configured to:
acquire a first load reference serving as a reference of a minimum pressing force that is necessary for deciding that the touch panel receives an input operation and a second load reference serving as a reference of a minimum pressing force that is necessary for deciding that a touch panel of another operation display apparatus receives an input operation, wherein the hardware processor determines that an input operation is received via the touch panel of the operation display apparatus only in a case in which a pressing force on the touch panel of the operation display apparatus is equal to or greater than the first load reference, wherein the first load reference is stored in advance in a memory of the operation display apparatus, and the second load reference is stored in advance in a memory of said another operation display apparatus, and wherein the hardware processor acquires the first load reference and the second load reference from the corresponding memories;
compare the first load reference and the second load reference with each other, and
change display control for displaying an operation object, in response to a result of the comparison, when the operation object has been displayed across a screen of the operation display apparatus and a screen of said another operation display apparatus.

21. An operation display apparatus comprising:
a touch panel; and
a hardware processor configured to:
acquire a first load reference serving as a reference of a minimum pressing force that is necessary for deciding that the touch panel receives an input operation and a second load reference serving as a reference of a minimum pressing force that is necessary for deciding that a touch panel of another operation display apparatus receives an input operation, wherein the hardware processor determines that an input operation is received via the touch panel of the operation display apparatus only in a case in which a pressing force on the touch panel of the operation display apparatus is equal to or greater than the first load reference, wherein the first load reference is stored in advance in a memory of the operation display apparatus, and the second load reference is stored in advance in a memory of said another operation display apparatus, and wherein the hardware processor acquires the first load reference and the second load reference from the corresponding memories, compare the first load reference and the second load reference with each other, and control information on an operation of at least one of the touch panels to be indicated in an output notification, in response to a result of the comparison, in a state in which an operation object has been displayed across a screen of the operation display apparatus and a screen of said another operation display apparatus, when the operation object of each screen has been touched.

22. A non-transitory computer readable recording medium storing an operation display program for controlling an operation display system having a plurality of operation display apparatuses each including a touch panel, wherein the operation display program causes a computer to perform:

a process of acquiring load references of the respective touch panels of a first operation display apparatus and a second operation display apparatus among the plurality of operation display apparatuses, the first operation display apparatus being an operation display apparatus operated by a user most recently among the plurality of operation display apparatuses and the second operation display apparatus being an operation display apparatus to be subsequently operated among the plurality of operation display apparatuses, the load references serving as a reference of a minimum pressing force that is necessary for deciding that the respective corresponding touch panels receive an input operation, wherein it is determined that an input operation is received via any one of the touch panels only in a case in which a pressing force on said any one of the touch panels is equal to or greater than the corresponding load reference of said any one of the touch panels, wherein the load references are respectively stored in advance in a memory of the corresponding operation display apparatus, and wherein the load references are acquired from the corresponding memories;

a process of comparing the load reference of the first operation display apparatus with the load reference of the second operation display apparatus; and a process of, when a result of the comparison indicates that there is a difference between the load references of the first and second operation display apparatuses, outputting a notification indicating a degree of a change in pressing force for pressing the touch panel of the second operation display apparatus.

23. A non-transitory computer readable recording medium storing an operation display program for controlling an operation display system having a plurality of operation display apparatuses each including a touch panel, wherein the operation display program is executable by a computer to cause the computer to perform:

a process of acquiring load references of the respective touch panels of a first operation display apparatus and a second operation display apparatus among the plurality of operation display apparatuses, the load references serving as a reference of a minimum pressing force that is necessary for deciding that the respective corresponding touch panels receive an input operation, wherein it is determined that an input operation is received via any one of the touch panels only in a case in which a pressing force on said any one of the touch panels is equal to or greater than the corresponding load reference of said any one of the touch panels, wherein the load references are respectively stored in advance in a memory of the corresponding operation display apparatus, and wherein the load references are acquired from the corresponding memories;

a process of comparing the load reference of the first operation display apparatus with the load reference of the second operation display apparatus; and a process of, when an operation object has been displayed across a screen of the first operation display apparatus and a screen of the second operation display apparatus, changing display control for displaying the operation object in response to a result of the comparison.

24. A non-transitory computer readable recording medium storing an operation display program for controlling an operation display system having a plurality of operation display apparatuses each including a touch panel, wherein the operation display program is executable by a computer to cause the computer to perform:

a process of acquiring load references of the respective touch panels of a first operation display apparatus and a second operation display apparatus among the plurality of operation display apparatuses, the load references serving as a reference of a minimum pressing force that is necessary for deciding that the respective corresponding touch panels receive an input operation, wherein it is determined that an input operation is received via any one of the touch panels only in a case in which a pressing force on said any one of the touch panels is equal to or greater than the corresponding load reference of said any one of the touch panels, wherein the load references are stored in advance in a memory of the corresponding operation display apparatus, and wherein the load references are acquired from the corresponding memories;

a process of comparing the load reference of the first operation display apparatus with the load reference of the second operation display apparatus; and a process of, in a state in which an operation object has been displayed across a screen of the first operation display apparatus and a screen of the second operation display apparatus, when the operation object of each screen has been touched, outputting a notification indicating information on an operation of at least one of the touch panels in response to a result of the comparison.

25. A non-transitory computer readable recording medium storing an operation display program for controlling an operation display apparatus including a touch panel, wherein the operation display program is executable by a computer to cause the computer to perform:

a process of acquiring a first load reference serving as a reference of pressing force by which the touch panel receives an operation and a second load reference serving as a reference of pressing force by which a touch panel of another operation display apparatus operated by a user most recently receives an operation;

a process of comparing the first load reference and the second load reference with each other; and a process of, when it is determined that the user intends to subsequently operate the operation display apparatus after having most recently operated said another operation display apparatus and a result of the comparison indicates that there is a difference between the first and second load references, outputting a notification indicating a degree of a change in pressing force for pressing the touch panel of the operation display apparatus.

26. A non-transitory computer readable recording medium storing an operation display program for controlling an operation display apparatus including a touch panel, wherein the operation display program is executable by a computer to cause the computer to perform:

a process of acquiring a first load reference serving as a reference of a minimum pressing force that is necessary for deciding that the touch panel receives an input operation and a second load reference serving as a reference of a minimum pressing force that is necessary for deciding that a touch panel of another operation display apparatus receives an input operation, wherein it is determined that an input operation is received via any one of the touch panels only in a case in which a pressing force on said any one of the touch panels is equal to or greater than the corresponding one of the first load reference and the second load reference, wherein the first load reference is stored in advance in a memory of the operation display apparatus, wherein the second load reference is stored in advance in a memory of said another operation display apparatus, and wherein the first load reference and the second load reference are acquired from the corresponding memories;

a process of comparing the first load reference and the second load reference with each other;

a process of, when an operation object has been displayed across a screen of the operation display apparatus and a screen of said another operation display apparatus, changing display control for displaying the operation object in response to a result of the comparison.

27. A non-transitory computer readable recording medium storing an operation display program for controlling an operation display apparatus including a touch panel, wherein the operation display program is executable by a computer to cause the computer to perform:

a process of acquiring a first load reference serving as a reference of a minimum pressing force that is necessary for deciding that the touch panel receives an input operation and a second load reference serving as a reference of a minimum pressing force that is necessary for deciding that a touch panel of another operation display apparatus receives an input operation, wherein it is determined that an input operation is received via any one of the touch panels only in a case in which a pressing force on said any one of the touch panels is equal to or greater than the corresponding one of the first load reference and the second load reference, wherein the first load reference is stored in advance in a memory of the operation display apparatus, wherein the second load reference is stored in advance in a memory of said another operation display apparatus, and wherein the first load reference and the second load reference are acquired from the corresponding memories;

a process of comparing the first load reference and the second load reference with each other; and a process of, in a state in which an operation object has been displayed across a screen of the operation display apparatus and a screen of said another operation display apparatus, when the operation object of each screen has been touched, outputting a notification indicating information on an operation of at least one of the touch panels in response to a result of the comparison.

* * * * *